(12) United States Patent
Laberge et al.

(10) Patent No.: US 11,148,751 B2
(45) Date of Patent: Oct. 19, 2021

(54) ADJUSTABLE FOOTREST FOR A VEHICLE

(71) Applicant: BOMBARDIER RECREATIONAL PRODUCTS INC., Valcourt (CA)

(72) Inventors: Nicolas Laberge, Valcourt (CA); Emile Maltais-Larouche, Valcourt (CA); Charles Lachance, Sherbrooke (CA); Bruno Cyr, Shefford (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 267 days.

(21) Appl. No.: 16/338,283

(22) PCT Filed: Sep. 29, 2017

(86) PCT No.: PCT/IB2017/056021
§ 371 (c)(1),
(2) Date: Mar. 29, 2019

(87) PCT Pub. No.: WO2018/060952
PCT Pub. Date: Apr. 5, 2018

(65) Prior Publication Data
US 2019/0315429 A1 Oct. 17, 2019

Related U.S. Application Data

(60) Provisional application No. 62/402,869, filed on Sep. 30, 2016.

(51) Int. Cl.
*B62L 3/04* (2006.01)
*B62J 25/00* (2020.01)
(Continued)

(52) U.S. Cl.
CPC ................. *B62L 3/04* (2013.01); *B62J 25/00* (2013.01); *B62K 5/05* (2013.01); *B62K 23/08* (2013.01)

(58) Field of Classification Search
CPC ............. B62L 3/04; B62J 25/00; B62K 23/08
See application file for complete search history.

(56) References Cited

U.S. PATENT DOCUMENTS 4,546,993 A 10/1985 Walker
5,090,715 A 2/1992 Funayama et al.
(Continued)

FOREIGN PATENT DOCUMENTS

CN 2423157 Y 3/2001
CN 202499223 U 10/2012
(Continued)

OTHER PUBLICATIONS

Supplementary European Search Report of Corresponding European Application No. 17855140.4; The Hague; dated May 6, 2020; Afanasiev, Andrey.
(Continued)

*Primary Examiner* — Tony H Winner
(74) *Attorney, Agent, or Firm* — BCF LLP

(57) ABSTRACT

A footrest assembly for mounting to a vehicle rail. A position of the assembly along the rail is adjustable. A footrest is connected to a rail mount to be pivotable about a footrest pivot axis between an adjustment position allowing adjustment of the assembly along the rail and a locked position. A clamping member, movable by the footrest relative to the rail mount, is in a releasing position when the footrest is in the adjustment position and in a clamping position when the footrest is in the locked position. When the clamping member is in the clamping position and the assembly is mounted to the rail, a portion of the clamping member and a portion of the rail mount are disposed on opposite sides of the rail and the clamping member applies a clamping pressure to the rail. The locked position sets the position of the assembly along the rail.

20 Claims, 23 Drawing Sheets

(51) Int. Cl.
*B62K 23/08* (2006.01)
*B62K 5/05* (2013.01)

(56) References Cited

U.S. PATENT DOCUMENTS

| | | | |
|---|---|---|---|
| 5,458,213 A | 10/1995 | Kurawaki et al. | |
| 5,524,918 A | 6/1996 | Delaney et al. | |
| 5,826,900 A * | 10/1998 | Steele | B62J 25/00 |
| | | | 280/291 |
| 6,152,474 A | 11/2000 | Rupert | |
| 6,688,629 B2 | 2/2004 | Essinger | |
| 6,957,821 B2 | 10/2005 | Bizer et al. | |
| 7,025,369 B1 * | 4/2006 | Sine | B62J 25/00 |
| | | | 280/291 |
| 7,040,442 B2 | 5/2006 | McWhorter | |
| 7,431,118 B1 | 10/2008 | Hogg | |
| 7,467,682 B1 | 12/2008 | Hahm | |
| 7,757,583 B1 | 7/2010 | Reading | |
| 7,823,900 B2 | 11/2010 | Warren | |
| 7,832,516 B2 | 11/2010 | Bagnariol | |
| 8,181,982 B1 * | 5/2012 | Ward | B62J 25/00 |
| | | | 280/291 |
| 9,352,795 B2 * | 5/2016 | Parvey | B62J 25/00 |
| 2005/0236203 A1 | 10/2005 | Toftner | |
| 2006/0144628 A1 | 7/2006 | McWhorter | |
| 2007/0057484 A1 * | 3/2007 | Gilman | B62J 25/00 |
| | | | 280/291 |
| 2016/0023706 A1 | 1/2016 | Chang et al. | |

FOREIGN PATENT DOCUMENTS

| | | | |
|---|---|---|---|
| CN | 103635381 A | 3/2014 | |
| CN | 203739953 U | 7/2014 | |
| CN | 203975051 U | 12/2014 | |
| CN | 10427286 * | 5/2015 | B62J 25/00 |
| CN | 104627286 | 5/2015 | |
| CN | 104709400 A | 6/2015 | |
| CN | 105813935 A | 7/2016 | |
| WO | 2015079427 | 6/2015 | |
| WO | WO2015/079427 A1 | 6/2015 | |

OTHER PUBLICATIONS

English Abstract of CN104627286; Retrieved from www.worldwide.espacenet.com.

International Search Report of PCT/IB2017/056021; dated Feb. 2, 2018; Blaine R. Copenheaver.

* cited by examiner

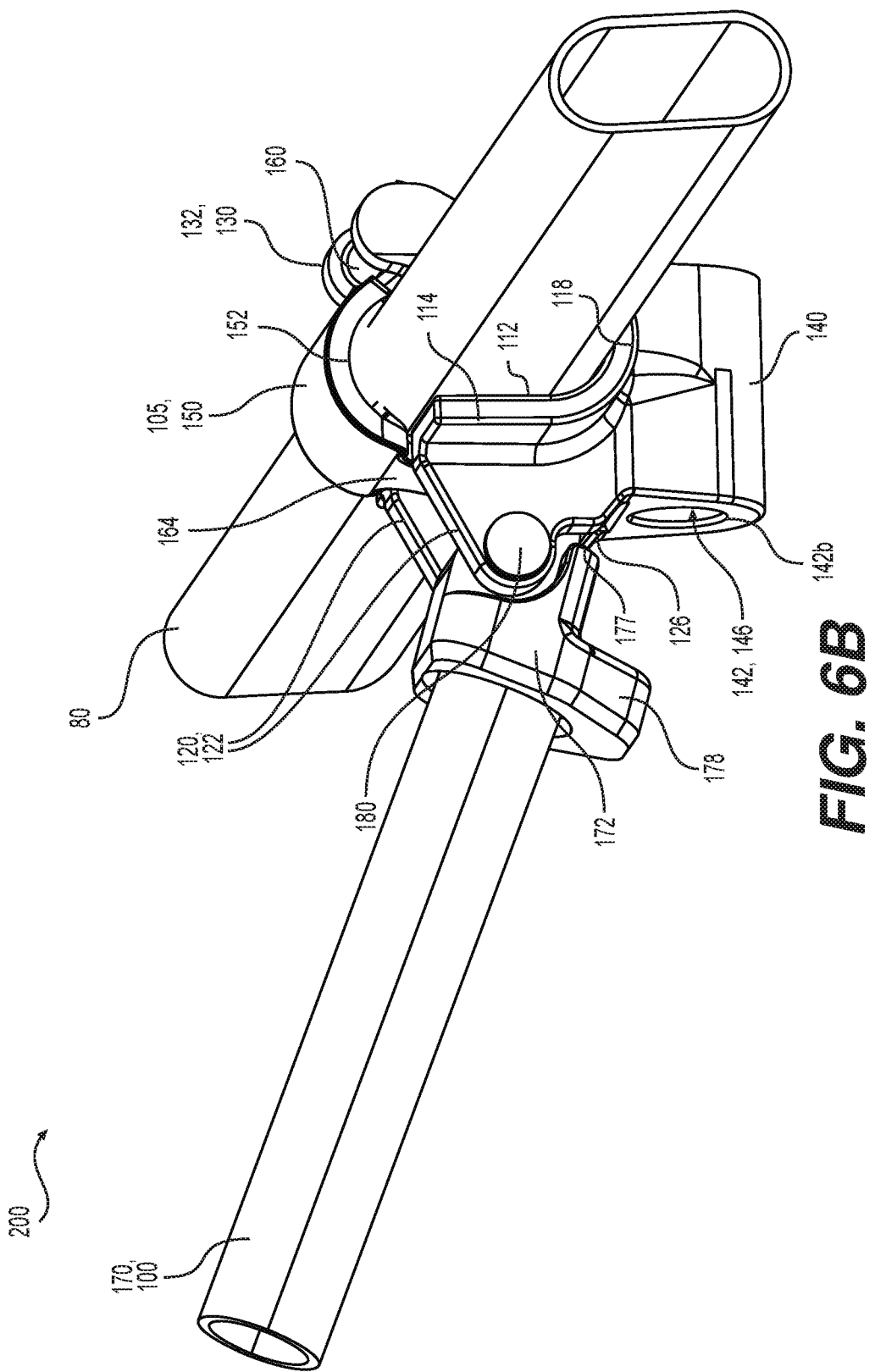

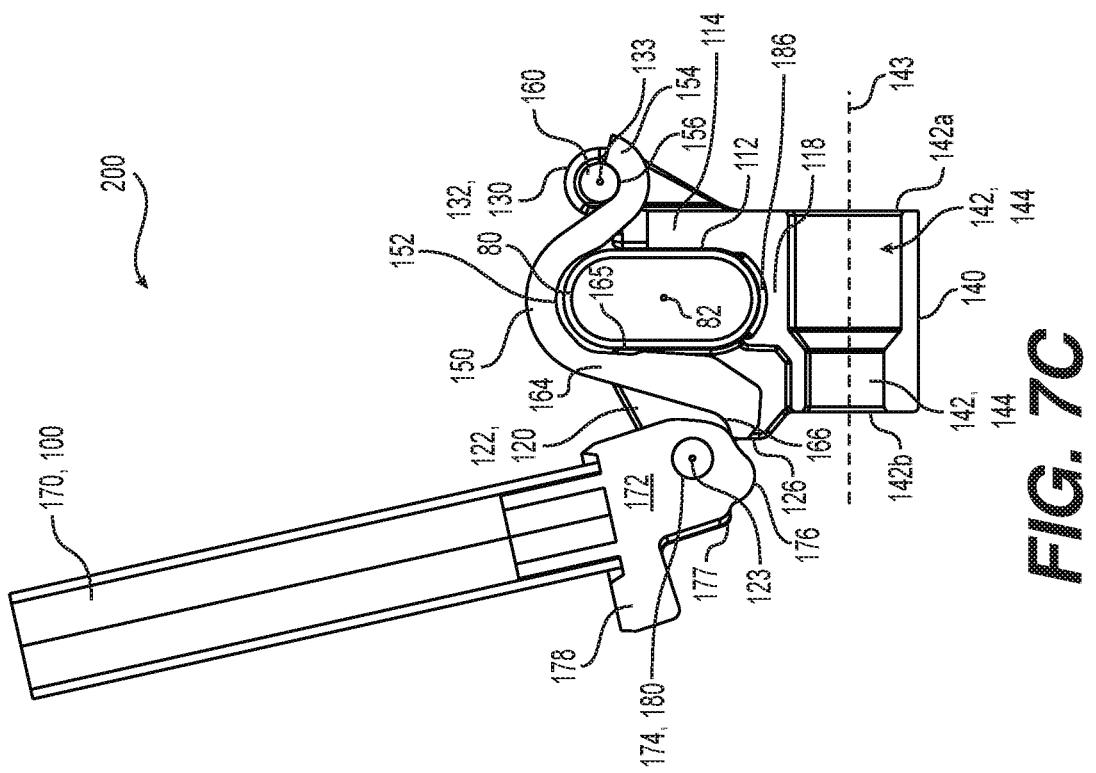

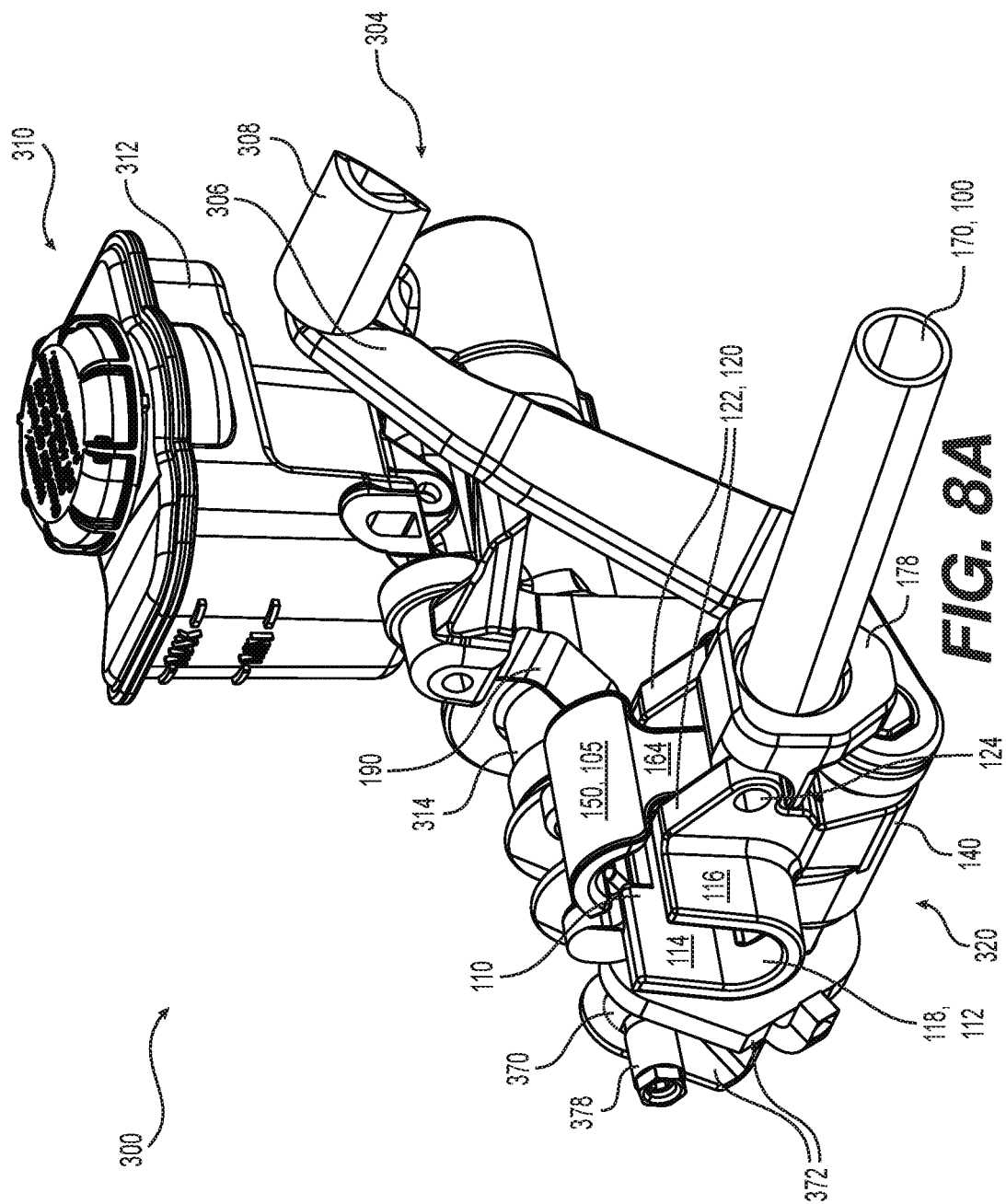

ADJUSTABLE FOOTREST FOR A VEHICLE

CROSS-REFERENCE

The present application claims priority to U.S. Provisional Patent Application No. 62/402,869 filed on Sep. 30, 2016, the entirety of which is incorporated herein by reference.

FIELD OF THE TECHNOLOGY

The present technology relates to footrests for vehicles.

BACKGROUND

Wheeled straddle-seat vehicles are provided with driver footrests on each side of the vehicle vertically below the seat to support the feet of the driver. The footrests are commonly in the form of footpegs or footboards, and are typically rigidly fixed to the vehicle frame. A foot-actuated brake lever may be provided near one of the footrests so that the driver can actuate the brakes with the foot without removing the foot from the footrest. In straddle-seat vehicles with manual or semi-automatic transmissions, a foot-operated gear shift lever may be provided near the other footrest so that the driver can change gears. As a vehicle may be driven by different drivers, it is desirable to have the ability to adjust the position of the driver footrests to accommodate drivers of different sizes and/or according to the driver's preferences.

A disadvantage of many such prior art adjustable footpegs is that the footrests are only adjustable to a limited number of predefined positions. Another disadvantage of many of the prior art systems is that the adjusting the position of the footrests is complex and requires the use of tools, and can therefore be inconvenient.

SUMMARY

It is an object of the present technology to ameliorate at least some of the inconveniences mentioned above.

According to one aspect of the present technology, there is provided a footrest assembly for mounting to a rail of a vehicle, a position of the footrest assembly along the rail being adjustable. The footrest assembly includes a rail mount and a footrest pivotally connected to the rail mount about a footrest pivot axis. The footrest is pivotable about the footrest pivot axis between an adjustment position and a locked position. A clamping member is movable by the footrest relative to the rail mount between a releasing position and a clamping position. The clamping member is in the releasing position when the footrest is in the adjustment position. The adjustment position of the footrest allowing adjustment of the footrest assembly along the rail. The clamping member is in the clamping position when the footrest is in the locked position. The clamping member in the clamping position having a portion facing a portion of the rail mount, the portion of the clamping member and the portion of the rail mount being disposed on opposite sides of the rail when the clamping member is in the clamping position and the footrest assembly is mounted to the rail. The clamping member applies a clamping pressure to the rail when the clamping member is in the clamping position and the footrest assembly is mounted to the rail. The locked position sets the position of the footrest assembly along the rail.

In some implementations, the footrest pivot axis extends parallel to a central axis of the rail in the position of the footrest assembly along the rail.

In some implementations, the portion of the clamping member is closer to the portion of the rail mount in the clamping position than in the releasing position.

In some implementations, the clamping member is pivotally connected to the rail mount about a clamping member pivot axis, the clamping member being pivotable about the clamping member pivot axis between the releasing position and the clamping position, the clamping member pivot axis being spaced from the footrest pivot axis.

In some implementations, the clamping member pivot axis extends parallel to the footrest pivot axis.

In some implementations, the footrest has a cam surface adapted for pushing the clamping member to the clamping position when the footrest is moved to the locked position.

In some implementations, the cam surface is adapted to exert a greater pressure on the clamping member when the footrest is at an intermediate position between the locked position and the adjustment position than when the footrest is in the locked position and when the footrest is in the adjustment position.

In some implementations, the clamping member is pivotable about the footrest pivot axis between the releasing position and the clamping position.

In some implementations, the clamping member is integrally formed with the footrest.

In some implementations, the clamping member and the footrest extend on opposite sides of the footrest pivot axis.

In some implementations, the clamping member has a cam surface adapted to abut the rail when the clamping member is in the clamping position.

In some implementations, the clamping member is an arm extending from the footrest.

In some implementations, a foot-operated lever is pivotably connected to the rail mount.

In some implementations, a position of the lever with respect to the rail mount is adjustable when the footrest is in the adjustment position and the clamping member is in the releasing position.

In some implementations, the lever is selectively mounted to the rail mount in one of at least a first rest position and a second rest position, When mounted to the rail mount in the first rest position, the lever is biased towards the first rest position and pivotable therefrom, about a first lever pivot axis, to a plurality of first actuated positions. When mounted to the rail mount in a second rest position, the lever is biased towards the second rest position and pivotable therefrom, about a second lever pivot axis, to a plurality of second actuated positions.

In some implementations, the rail mount has a lever mounting bracket, the lever being pivotably connected to the rail mount by the lever mounting bracket. One of the footrest and the clamping member has a lever blocking member. The lever blocking member is movable with respect to the lever mounting bracket with the one of the footrest and the clamping member about a corresponding one of the footrest axis and the clamping member axis. The lever blocking member is positioned so as to prevent adjustment of the position of the lever when the footrest is in the locking position and the clamping member is in the clamping position. The lever blocking member is positioned so as to allow adjustment of the position of the lever when the footrest is in the adjustment position and the clamping member is in the releasing position.

In some implementations, the first lever pivot axis is coaxial with the second lever pivot axis and the first rest position is rotated about the first lever pivot axis with respect to the second rest position.

In some implementations, the lever is a brake lever connected to a brake actuation assembly for actuating a brake of the vehicle. A brake lever adjustment assembly includes a lever splined member (LSM) coaxial with the first lever pivot axis and fixed to the brake lever to be rotatable with the brake lever about the first lever pivot axis, and a brake lever adjustment splined member (BLASM) pivotably connected to the rail mount about the first lever pivot axis and operatively connected to the brake actuation system for actuating the brake. The BLASM has a BLASM rest position corresponding to an unactuated configuration of the brake. The BLASM is rotatable about the first lever pivot axis from the BLASM rest position to a plurality of BLASM actuated positions for actuating the brake. The BLASM in the BLASM rest position selectively engages the LSM with the lever disposed in any one of the first rest position and the second rest position. When the BLASM in the BLASM rest position engages the LSM in the first rest position, the plurality of first actuated positions correspond to the plurality of BLASM actuated positions for actuating the brake, and when the BLASM in the BLASM rest position engages the LSM in the second rest position, the plurality of second actuated positions correspond to the plurality of BLASM actuated positions for actuating the brake.

In some implementations, one of the footrest and the clamping member includes a lever blocking member. The lever blocking member is movable with one of the footrest and the clamping member about a corresponding one of the footrest axis and the clamping member axis. One of the BLASM and the LSM is disposed between the lever blocking member and an other of the BLASM and the LSM when the footrest is in the locked position and the clamping member is in the clamping position. The lever blocking member thereby blocks the LSM from being moved away with respect to the BLASM in a direction along the first pivot axis for disengaging the LSM from the BLASM when the footrest is in the locked position and the clamping member is in the clamping position. The lever blocking member moves away from the first pivot axis when the footrest moves from the locked position to the adjustment position and the clamping member moves from the clamping position to the releasing position. The LSM is moveable with respect to the BLASM in the direction along the first pivot axis when the footrest is in the adjustment position and the clamping member is in the releasing position. The LSM is thereby disengageable from the BLASM when the footrest is in the adjustment position and the clamping member is in the releasing position. The lever is thereby moveable from one of the first rest position and the second rest position to an other of the first rest position and the second rest position when the footrest is in the adjustment position and the clamping member is in the releasing position.

In some implementations, the lever is a brake lever connected to a brake actuation system for actuating a brake of the vehicle.

In some implementations, a master cylinder mounting bracket is connected to the rail mount and moveable therewith, the master cylinder mounting bracket being adapted for connection of a master cylinder of the brake actuation system.

In some implementations, a resilient member disposed on at least one of the rail mount and the clamping member for contacting the rail at least when the clamping member is in the clamping position and the footrest is in the locked position.

According to another aspect of the present technology, there is provided a vehicle having a frame defining a longitudinal centerplane and a motor supported by the frame. At least one front wheel and at least one rear wheel are supported by the frame. At least one of the at least one front wheel and the at least one rear wheel is operatively connected to the motor. A straddle-type seat is supported by the frame. A left rail is connected to the frame, the left rail being disposed below the straddle seat and extending at least in a longitudinal direction on a left side of the longitudinal centerplane. A right rail is connected to the frame, the right rail being disposed below the straddle seat and extending at least in the longitudinal direction on a right side of the longitudinal centerplane. The vehicle also includes a left footrest assembly according to any one of the above-described implementations mounted on the left rail; and a right footrest assembly according to any one of the above-described implementations mounted on the right rail.

In some implementations, each of the left rail and the right rail has a non-circular cross-section.

In some implementations, the cross-section of the rails is generally stadium-shaped.

In some implementations, a foot-operated lever is pivotably connected to the rail mount of one of the left and right footrest assemblies.

In some implementations, at least one of the at least one front wheel and the at least one rear wheel is operatively connected to a brake actuation system and the foot operated lever is a brake lever connected to the brake actuation system.

In some implementations, the brake actuation system comprises a master cylinder mounted to the rail mount and being movable with the rail mount.

For the purpose of this application, terms related to spatial orientation such as downwardly, rearwardly, forward, front, rear, left, right, above and below are as they would normally be understood by a driver of the vehicle sitting thereon in an upright position with the vehicle in a straight ahead orientation (i.e. not steered left or right), and in an upright position (i.e. not tilted).

Implementations of the present vehicle each have at least one of the above-mentioned object and/or aspects, but do not necessarily have all of them. It should be understood that some aspects of the present vehicle that have resulted from attempting to attain the above-mentioned object may not satisfy this object and/or may satisfy other objects not specifically recited herein.

Additional and/or alternative features, aspects, and advantages of implementations of the present vehicle will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 6B is a perspective view, taken from a top, rear and left side, of the left footrest assembly and rail of FIG. 3 with the left footrest being disposed in an intermediate position between the locked position and the adjustment position;

FIG. 7C is a cross-sectional view, of the left footrest assembly and rail of FIG. 6A, taken alone the line 7A-7A of FIG. 2, with the left footrest being disposed in the adjustment position;

FIG. 8A is a perspective view, taken from a rear and right side, of the right footrest assembly of FIG. 1 with the rail removed for clarity and showing the brake lever disposed in a first rest position and a part of a hydraulic brake actuation system;

DETAILED DESCRIPTION

The present description is provided with respect to a three-wheel straddle-type vehicle 10. However, it should be understood that other types of straddle-type vehicles such as, for example, motorcycles, and three- or four-wheel all-terrain vehicles are also contemplated.

Figure 1:
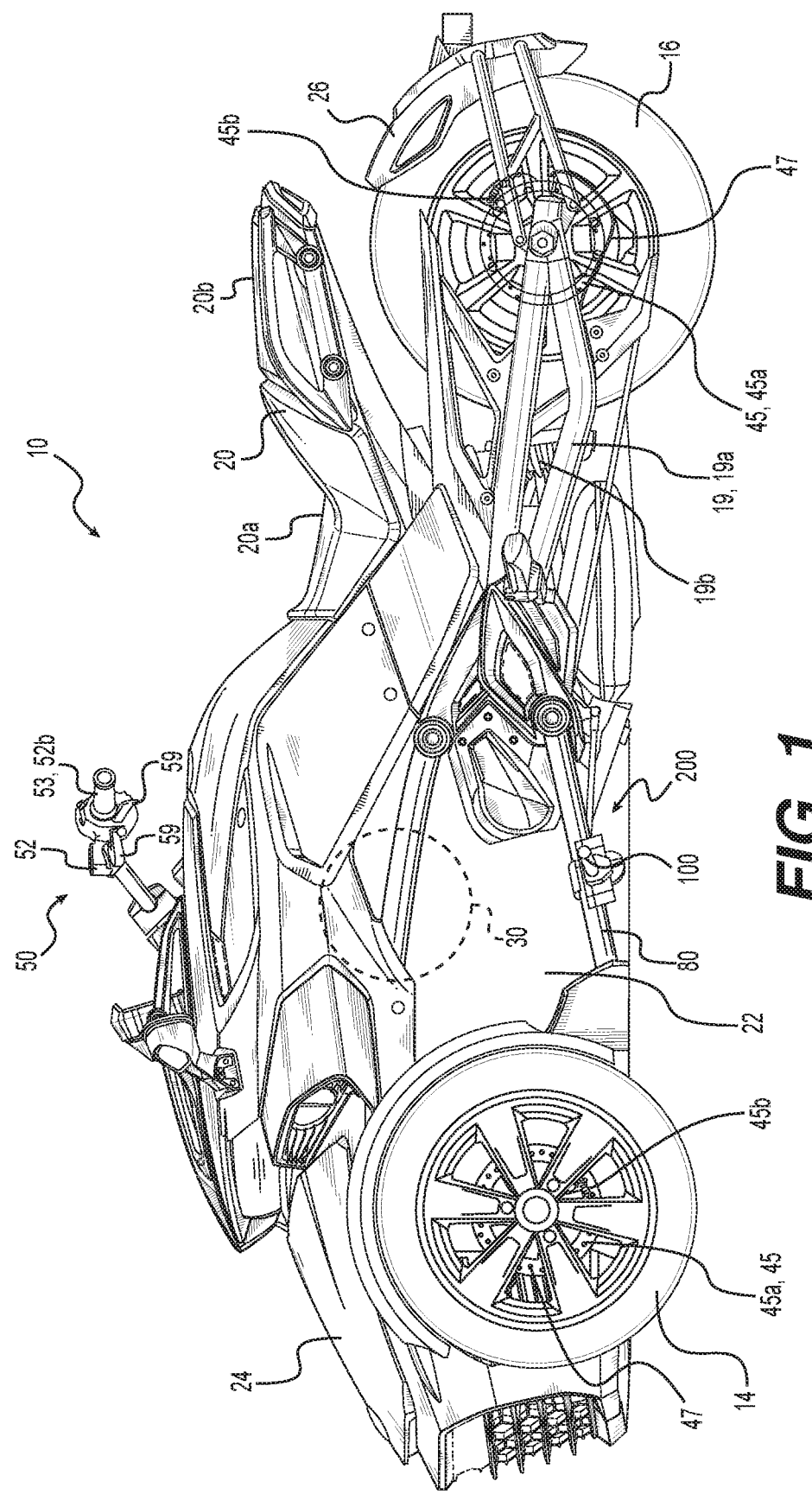
FIG. 1 is a left side elevation view of a three-wheel straddle-type vehicle showing a left adjustable footrest assembly mounted on a left rail.
Figure 2:
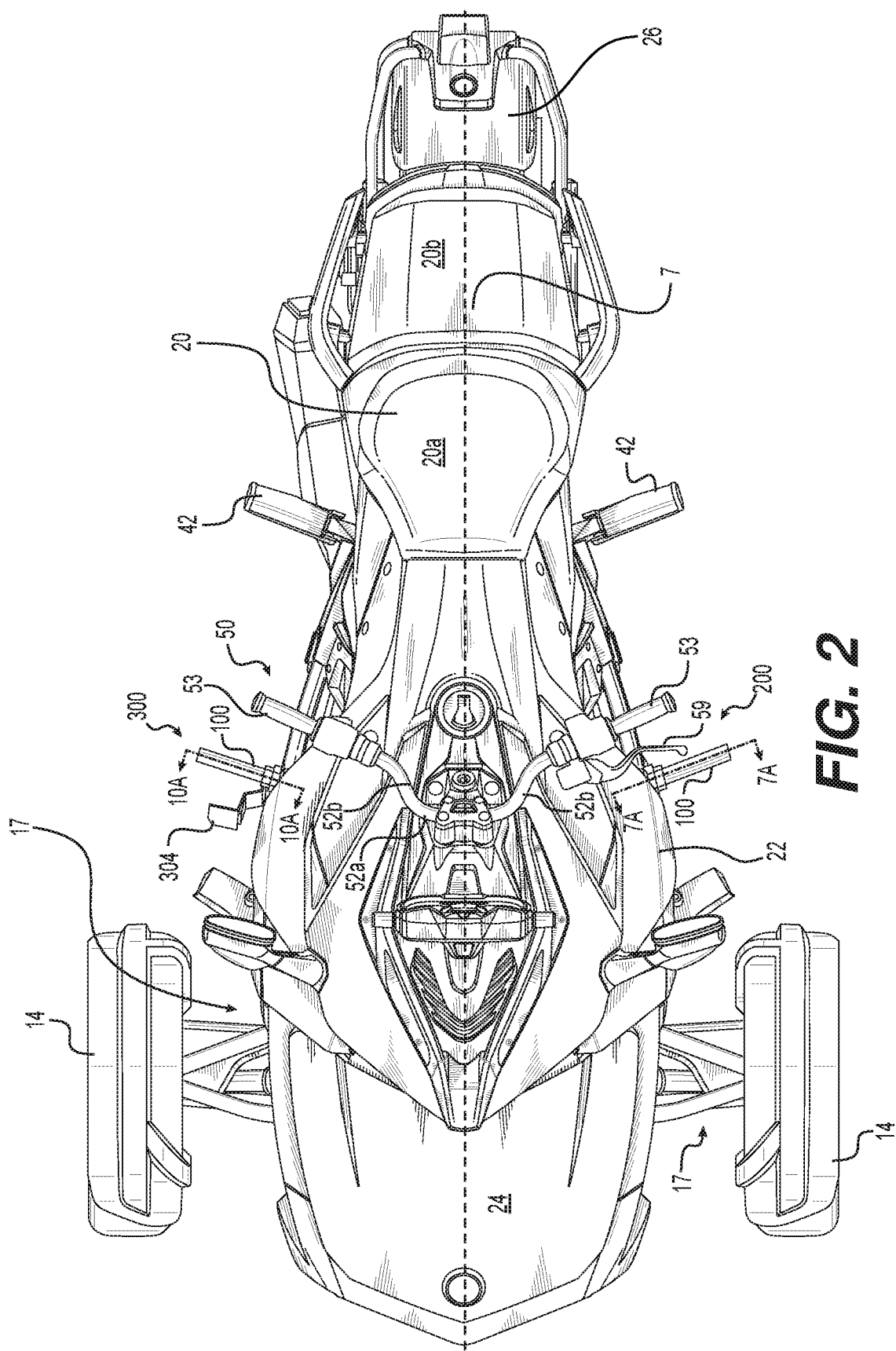
FIG. 2 is a top plan view of the vehicle of FIG. 1 showing the left adjustable footrest assembly mounted on the left rail and a right adjustable footrest assembly mounted on a right rail.

With reference to FIGS. 1 and 2, a vehicle 10 has a front portion 2 and a rear portion 4 defined consistently with the forward travel direction of the vehicle 10. The vehicle 10 has a frame 12 which defines a longitudinal centerplane 7.

The vehicle 10 is a three-wheel vehicle 10 including a left front wheel 14, a right front wheel 14 and a single rear wheel 16. It is however contemplated that the vehicle 10 could have more than one rear wheel 16 and/or a single front wheel 14. The left and right front wheels 14 and the rear wheel 16 each have a tire secured thereto. It is contemplated that the front wheels 14 or the rear wheel 16 could have more than one tire secured thereto. The front wheels 14 are equally offset from the longitudinal centerplane 7 in the lateral direction, and the rear wheel 16 is centered with the longitudinal centerplane 7.

As can be seen in FIG. 2, each front wheel 14 is mounted to the frame 12 of the vehicle 10 via a front suspension assembly 17. In the illustrated implementation, the front suspension assembly 17 is a double A-arm type suspension, also known as a double wishbone suspension. It is contemplated that other types of suspensions, such as a MacPherson strut, could be used.

As can be seen in FIG. 1, the rear wheel 16 is connected to the frame 12 by a rear suspension assembly 19 which includes a swing arm 19a and a shock absorber 19b. The swing arm 19a has two arms pivotally mounted at a front thereof to the frame 12. The rear wheel 16 is rotatably mounted between the rear ends of the two arms. The shock absorber 19b is connected between the swing arm 19a and the frame 12.

The vehicle 10 is a straddle-type vehicle having a straddle seat 20 disposed along the longitudinal centerplane 7 and supported by the frame 12. The straddle seat 20, adapted to accommodate two adult-sized riders, includes a forward seat portion 20a for a driver and a rear seat portion 20b for a passenger. The second portion 20b is higher than the first portion 20a. It is contemplated that the three-wheel vehicle 10 could not have the rear seat portion 20b.

With reference to FIG. 1, the frame 12 supports a motor 30 (shown schematically) located vertically lower than the straddle seat 20 and longitudinally rearward of the front wheels 14. In the illustrated implementation of the vehicle 10, the motor 30 is in the form of an internal combustion engine. It is however contemplated that the motor 30 could be other than an internal combustion engine. For example, the motor 30 could be an electric motor, a hybrid or the like. The motor 30 will be referred to hereinafter as engine 30 for convenience. The engine 30 is an inline, three-cylinder, four-stroke, internal combustion engine in the illustrated implementation of the vehicle 10, but it is contemplated that other types of internal combustion engines could be used. The engine 30 is operatively connected to the rear wheel 16 to drive the rear wheel 16. It is contemplated that the engine 30 could be connected to the front wheels 14 instead of, or in addition to, the rear wheel 16.

With reference to FIGS. 1 and 2, fairings 22 are connected to the frame 12 to enclose and protect the internal components of the three-wheel vehicle 10 such as the engine 32. The fairings 22 include a hood 24 disposed at the front of the vehicle 10 between the front wheels 14. The hood 24 is pivotably connected to the frame 12 and can be disposed in an open position to provide access to a storage bin (not shown) disposed under the hood 24. The fairings 22 also include a rear deflector 26 disposed over the rear wheel 16 to protect the driver and/or passenger from dirt and water which can be lifted by the wheel 16 while it is rolling.

With reference to FIG. 1, each of the two front wheels 14 and the rear wheel 16 is provided with a brake 45. The brakes 45 of the three wheels 14, 16 form a brake assembly 47. Each brake 45 is a disc-type brake mounted onto a hub of the respective wheel 14 or 16. Other types of brakes are contemplated. Each brake 45 includes a rotor 45a mounted onto the wheel hub and a stationary caliper 45b straddling the rotor 45a. The brake pads (not shown) are mounted to the caliper 45b so as to be disposed between the rotor 45a and the caliper 45b on either side of the rotor 45a. When hydraulic pressure is applied to a piston (not shown) of the caliper 45b, the brake pads squeeze the rotor 45a which, through friction, brakes the wheel 14 or 16. The brake pads are connected to a hydraulic actuation system 310 (FIG. 8A) that will be described further below.

With reference to FIGS. 1 and 2, a steering assembly 50 is disposed forwardly of the straddle seat 20 to allow a driver to steer the two front wheels 14. The steering assembly 50 includes a handlebar 52 connected to a steering column (not shown). The steering column is connected to the front wheels 14 via steering linkages (not shown) such that turning the handlebar 52 turns the steering column which, through the steering linkages, turns the wheels 14. In the illustrated implementation of the vehicle 10, the steering assembly 50 includes a power steering unit (not shown) to facilitate steering of the vehicle 10. It is contemplated that the power steering unit could be omitted.

With reference to FIGS. 1 and 2, the handlebar 52 includes a central portion 52a connected to the upper end of the steering column. The central portion 52a extends upwardly and leftwardly to a left handle 52b, and upwardly and rightwardly to a right handle 52b. A left hand grip 53 and a right hand grip 53 are placed respectively around the left and right handles 52b. A clutch actuator 59 is connected to the handlebar 52 near the left hand grip 53. It is contemplated that a hand operated brake actuator could also be connected to the handlebar 52 near one of the hand grips 53. In the illustrated implementation of the vehicle 10, the position of the handles 52b and the grips 53 is fixed. It is contemplated that the handlebar 52 could be adjustable such that the handles 52b and grip 53 may be repositioned, for example, in accordance with the driver's size and preferences.

With reference to FIGS. 1 and 2, driver footrests 100 are disposed on either side of the vehicle 10 and vertically lower than the straddle seat 20 to support the driver's feet. In the illustrated implementation of the vehicle 10, the driver footrests 100 are in the form of foot pegs. It is also contemplated that the footrests 100 could be in the form of footboards. The left driver footrest 100 is formed as part of a left footrest assembly 200 mounted on a left rail 80 connected to the frame 12 and disposed on a left side of the longitudinal centerplane 7. The right driver footrest 100 is formed as part of a right footrest assembly 300 which is mounted on a right rail 80 connected to the frame 12 and disposed on a right side of the longitudinal centerplane 7.

The driver footrests 100 are adjustably mounted to their respective rails 80 and can be retained at any position thereon as will be discussed below in further detail. In the illustrated implementation, the left rail 80 is a mirror image of the right rail 80. It is however contemplated that the left rail 80 could be configured differently than the right rail 80.

As can be seen in FIG. 2, a brake actuator, in the form of a foot-operated brake lever 304, is connected to the right driver footrest 100 for braking the vehicle 10. The brake lever 304 is operatively connected to the brakes 45 provided on each of the two front wheels 14 and the rear wheel 16. It is contemplated that the brake lever 304 could be operatively connected only to the brakes 45 of the front wheels 14, or only to the brake 45 of the rear wheel 16. The brake lever 304 forms part of the right footrest assembly 300 which will be described in greater detail below. It is contemplated that the foot-operated brake lever 304 could be omitted and the vehicle 10 could be provided with a hand-operated brake actuator connected to the handlebar 52. It is contemplated that the brake assembly 47 could be connected to a hand-operated brake actuator mounted to the handlebar 52 in addition to the brake lever 304 mounted to the right footrest assembly 200.

With reference to FIGS. 1 and 2, passenger footrests 42 are disposed on either side of the vehicle 10 and rearward of the rails 80 to provide support for the passenger's feet. The passenger footrests 42 are fixed to the frame 12. It is further contemplated that the passenger footrests 42 be in the form of adjustable footrests similar to the driver footrests 100 that are adjustably connected to the rail 80 or to another rail similar to the rail 80. In the illustrated implementation, the passenger footrests 42 are in the form of foot pegs. It is however contemplated that the footrests 42 could be in the form of footboards.

The rail 80 has a central rail axis 82 (FIG. 7A) and a stadium-shaped cross-section normal to the rail axis 82. It is contemplated that the rail 80 could have other non-circular cross-sections, such as elliptical, square and rectangular. It is also contemplated that the rail 80 could be circular in cross-section. It is contemplated that each rail 80 could have one or more visual indicators of footrest positions to facilitate adjustment of the position of a footrest 100 along the rail and alignment of the left footrest 100 with the right footrest 100. The visual indicators could be in the form of a notch, a marker or the like.

Turning now to FIGS. 3 to 7C, the right and left footrest assemblies 200, 300 will now be described in detail.

The left footrest assembly 200 includes the left footrest 100, a clamping member 105 and a rail mount 110.

The rail mount 110 defines a surface 112 facing towards the rail 80 and being complementary to an outer surface of the rail 80. In the illustrated implementation, the surface 112 forms a U-shaped cross-section when viewed along the rail axis 82 in order to be complementary to the rail 80 of the illustrated implementation having a stadium-shaped cross-section. The U-shaped surface 112 is defined by a laterally inner arm 114 extending along a laterally inner side of the rail 80, a laterally outer arm 116 extending along a laterally outer side of the rail 80, and a curved central portion 118 extending between the laterally inner arm 114 and the laterally outer arm 116. In the illustrated implementation, the central portion 118 extends along a lower surface of the rail 80.

Figure 7A:
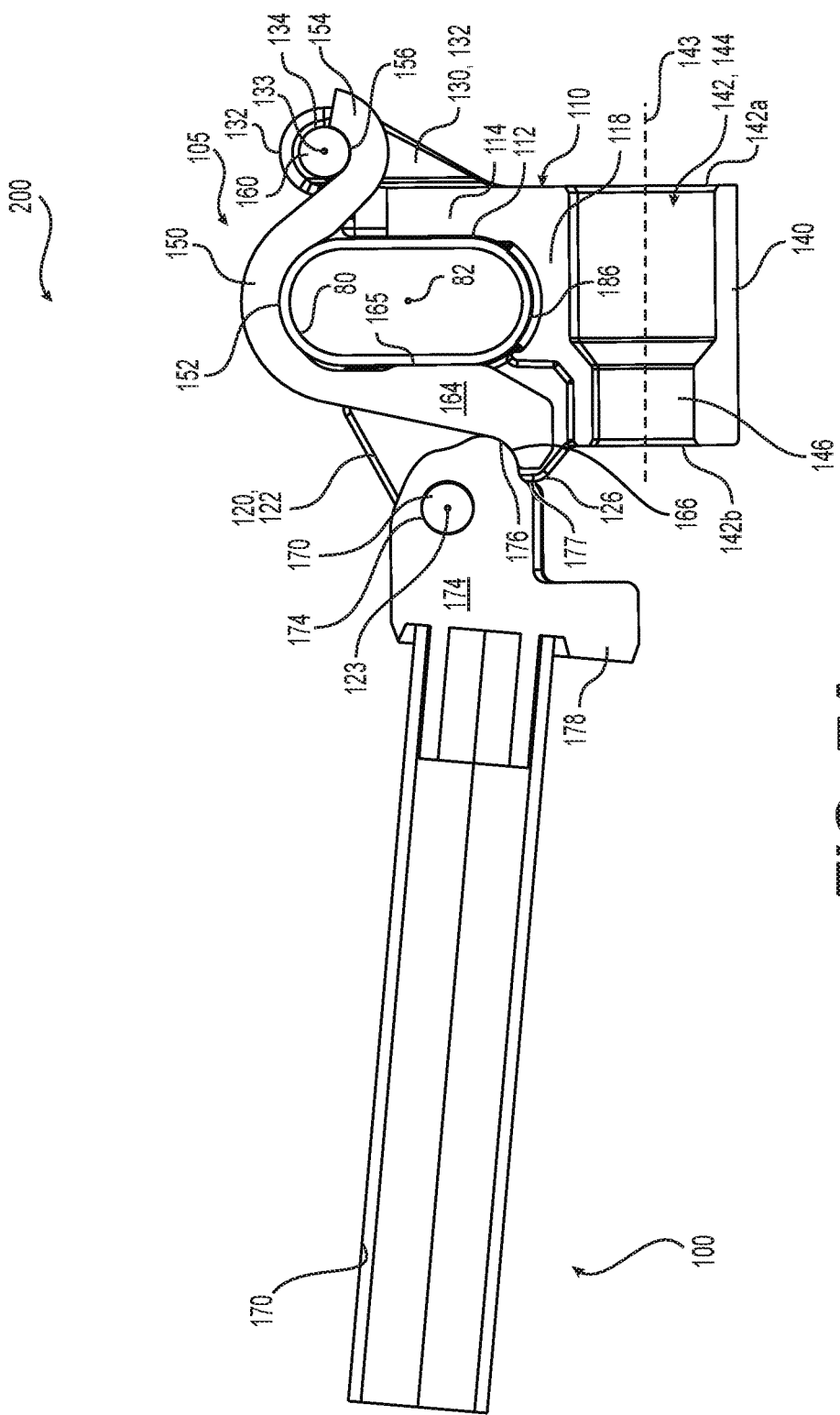
FIG. 7A is a cross-sectional view, of the left footrest assembly and rail of FIG. 3, taken alone the line 7A-7A of FIG. 2, with the left footrest being disposed in the locked position.
Figure 7B:
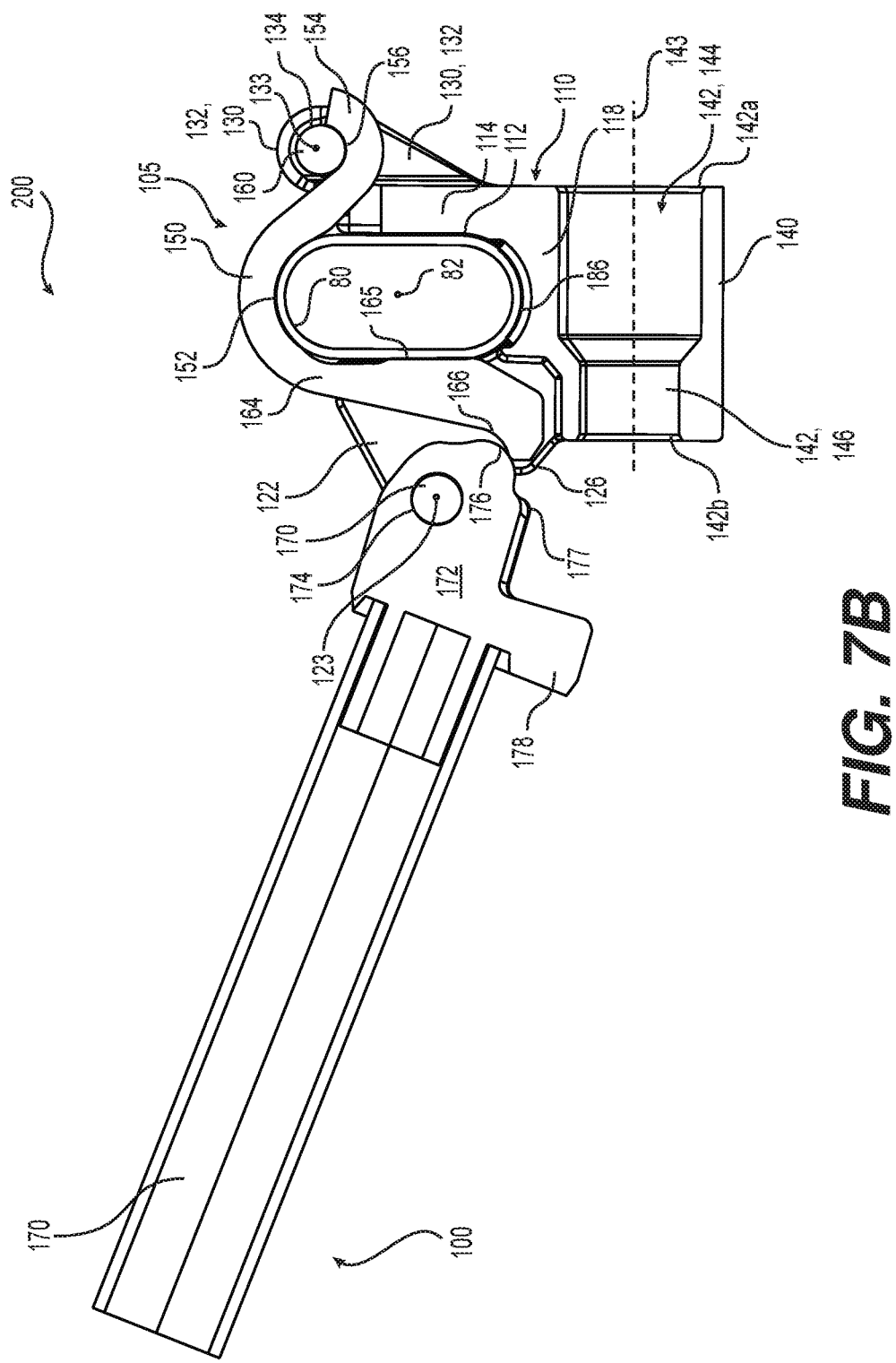
FIG. 7B is a cross-sectional view, of the left footrest assembly and rail of FIG. 6B, taken alone the line 7A-7A of FIG. 2, with the left footrest being disposed in the intermediate position between the locked position and the adjustment position.

The rail mount 110 has a footrest mounting bracket 120 extending laterally outwardly from the laterally outer arm 116. The footrest mounting bracket 120 is used to mount the footrest 100. The footrest mounting bracket 120 includes a pair of spaced apart tabs 122. Each tab 122 has an aperture 124 defined therethrough. The apertures 124 define a footrest pivot axis 123 (FIG. 7A). In the illustrated implementation, the footrest pivot axis 123 is parallel to the central axis 82 of the rail 80, and disposed on a laterally outer side of the rail 80. In a cross-section taken along a plane normal to the rail axis 82, the footrest pivot axis 123 is disposed vertically lower than the rail axis 82 and vertically higher than a lower surface of the rail 80. The left footrest 100 is pivotably mounted to the footrest mounting bracket 120 as will be described below. The footrest mounting bracket 120 has a portion 126 disposed below the tabs 122 that serves as a footrest stop 126 to limit the downward pivoting of the footrest 100 (best seen in FIG. 7A) as will be described below in further detail.

The rail mount 110 has a clamping member bracket 130 extending upwardly from the laterally inner arm 114. The clamping member bracket 130 is used to mount the clamping member 105. The clamping member bracket 130 includes a pair of spaced apart tabs 132. Each tab 132 has an aperture 134 defined therethrough. The apertures 134 define a clamping member pivot axis 133 (FIG. 7A). In the illustrated implementation, the clamping member pivot axis 133 is parallel to the central axis 82 of the rail 80 and to the footrest pivot axis 123, and disposed on a laterally inner side of the rail 80. In a cross-section taken along a plane normal to the rail axis 82, the clamping member pivot axis 133 is disposed vertically higher than the rail axis 82 and the footrest pivot axis 123. The clamping member 105 is pivotably mounted to the clamping member bracket 130 as will be described below.

The rail mount 110 also has a lever mounting bracket 140 disposed below the footrest mounting bracket 120, the arms 112, 114 and the central portion 118. The lever mounting bracket 140 is used to mount a foot-operated lever, such as a gear shift actuator or a brake lever 304 as in the implementation illustrated in FIGS. 8A to 10B. The lever mounting bracket 140 defines a tubular passage 142 extending therethrough from a laterally inner end 142a disposed below the laterally inner arm 114 of the rail mount 110 to a laterally outer end 142b disposed below the tabs 122. The tubular passage 140 has an inner portion 144 extending laterally outwardly from the inner end 142a and an outer portion 146 extending laterally outwardly from the first portion 144 to the outer end 142b. The inner portion 144 has a diameter that is larger than the outer portion 146. A central axis 143 of the passage 142 extends generally laterally and perpendicular to the rail axis 82. The lever mounting bracket 140 will be described in further detail below with respect to the right footrest assembly 300. It is contemplated that the lever mounting bracket 140 could be omitted in the left footrest assembly 200.

A resilient member 186 is placed on the inner surface 112 of the central portion 118 of the rail mount 110. The resilient member 186 engages the lower surface of the rail 80 to provide additional traction or grip between the rail 80 and the rail mount 110 as well as to improve the distribution of force exerted on the rail 80 by the clamping member 105. In the illustrated implementation the resilient member 186 is a foam pad but it is contemplated that the resilient member 186 could be made of any suitable material. It is also contemplated that the resilient member 186 could be omitted, differently sized, or placed elsewhere other than as shown herein.

Figure 5:
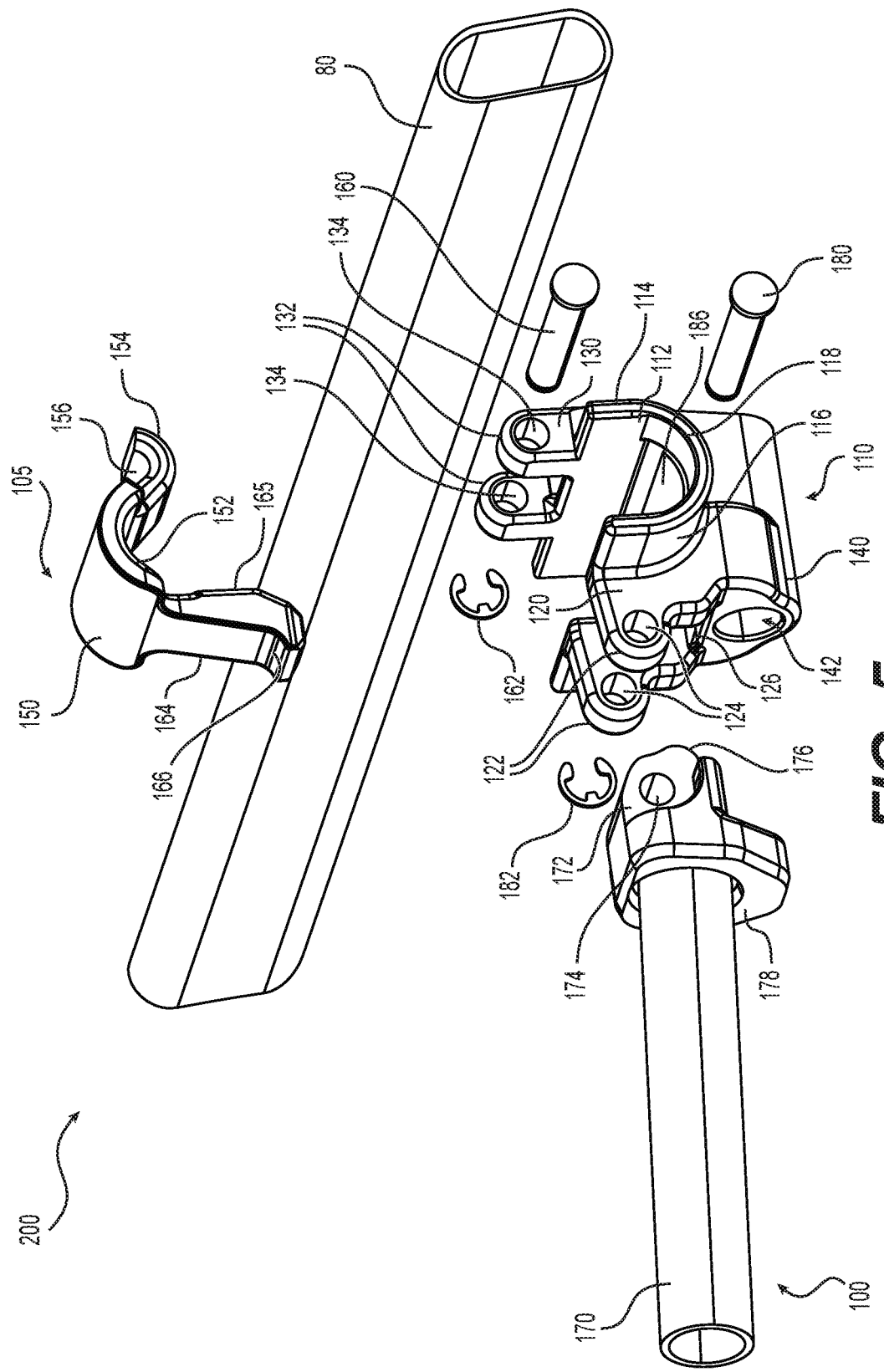
FIG. 5 is an exploded perspective view, taken from a top, rear and left side, of the left footrest assembly and rail of FIG. 3.

As best seen in FIG. 5, the clamping member 105 is also generally U-shaped with a central portion 150 interconnecting a rail mount engaging bracket 154 and a footrest engaging bracket 164. The central portion 150 is curved to conform to the upper surface of the rail 80 and defines a rail engaging surface 152 facing towards the rail 80.

The rail mount engaging bracket 154 extends laterally inwardly away from one side of the central portion 150 and away from the rail 80. An end portion of the rail mount engaging bracket 154 curves upwardly away from the rail 80 to define a curved surface 156 facing away from the rail 80. The rail mount engaging bracket 154 is used to mount the clamping member 105 to the clamping member bracket 130 of the rail mount 110. The curved surface 156 is received between the two tabs 132. A pin 160 is inserted through one of the tabs 132, passed above the curved surface 156, and then through the other tab 132. It is contemplated that the bracket 154 could define an aperture for receiving the pin 160 therethrough instead of the curved surface 156. A circlip 162 is inserted around the shaft of the pin 160 from the end opposite the head of the pin 160 to lock the pin 160 in place. The clamping member 105 is thus mounted pivotably to the rail mount 110 by the pin 160. The clamping member 105 is pivotable about the pin 160. In the illustrated implementation, a central axis of the pin 160 coincides with a central axis defined by the apertures 134 of the tabs 132. The clamping member pivot axis 133 is thus defined by the coinciding central axes of the pin 160 and tab apertures 134. It is however contemplated that the relative sizes of the tab apertures and the pin 160, and/or the shape of the tab apertures 134 could be configured such that a central axis of the pin 160 could be movable relative to a central axis defined by the tab apertures 134. In this case, the clamping member pivot axis 133 would be defined by the central axis of the pin 160. In the illustrated implementation, the clamping member pivot axis 133 is parallel to the central axis 82 of the rail 80, and disposed on a laterally inner side of the rail 80. In a cross-section taken along a plane normal to the rail axis 82, the clamping member pivot axis 133 is disposed vertically higher than the rail axis 82 and vertically lower than the upper surface of the rail 80.

The footrest engaging bracket 164 of the clamping member 105 extends downwardly from the central portion 150 along a laterally outer side of the rail 80 between the tabs 122 of the footrest mounting bracket 120. An inner surface 165 of the footrest engaging bracket 164 contacts the laterally outer surface of the rail 80 at least when the clamping member 105 is in a clamping position as will be described below. An end portion of the footrest engaging bracket 164 curves outwardly away from the rail 80. The outer curved surface 166 of the end portion of the footrest engaging bracket 164 engages a cam surface 176 of the footrest 100.

In the illustrated implementation of the clamping member 105, the longitudinal direction width of the central portion 150 is greater than the respective longitudinal direction widths of the brackets 154, 164. It is however contemplated that the relative widths of the central portion 150, and brackets 154, 164 could be different than as shown herein.

The footrest 100 has an elongated support member 170 that supports the rider's foot. In the illustrated implementation, the footrest 100 is a footpeg and the support member 170 is hollow and cylindrical. It is however contemplated that the support member could be configured differently than as shown herein. For example, the support member 170 could be solid and/or other than cylindrical. It is also contemplated that the footrest 100 could be a footboard and the support member could have a planar top surface. The footrest 100 has a mounting bracket 172 connected to a laterally inner end of the support member 170. The mounting bracket 172 defines an aperture 174 extending therethrough. The laterally inwardly facing surface of the mounting bracket 172 defines a cam surface 176 and a shoulder 177 (FIG. 6B, 7A) disposed below the cam surface 176. The mounting bracket 172 is received between the tabs 122 of the footrest mounting bracket 120 such that the aperture 174 is aligned with the tab apertures 124 of the rail mount 110 and the cam surface 176 contacts the curved surface 166 of the footrest engaging bracket 164 of the clamping member 105. A pin 180 is inserted through the aligned apertures 124 and 174. A circlip 182 is inserted around the shaft of the pin 180 from the end opposite the head of the pin 180 to retain the pin 180 in the apertures 124, 174 and to retain the footrest 100 on the rail mount 110. The footrest 100 is thus mounted pivotably to the rail mount 110 by the pin 180 so as to be pivotable about the footrest pivot axis 123. In the illustrated implementation, a central axis of the pin 180 coincides with the central axis defined by the apertures 124 of the tabs 122. The footrest pivot axis 123 is thus defined by the coinciding central axes of the pin 180 and tab apertures 124. It is however contemplated that the relative sizes of the tab apertures and the pin 180, and/or the shape of the tab apertures 124 could be configured such that a central axis of the pin 180 could be movable relative to a central axis defined by the tab apertures 124. In this case, the footrest member pivot axis 123 would be defined by the central axis of the pin 180.

The footrest 100 has a blocking member 178 extending downwardly from the mounting bracket 172 and extending vertically lower than the lower surface of the support member 170 when the footrest 100 is disposed with the support member 170 extending laterally outwardly from the rail mount 110. The blocking member 178 which moves with the footrest 100 serves to block the opening 142b of the lever mounting bracket 140 when the footrest 100 is in a locking position and moves away from the opening 142b when the footrest 100 is in an adjustment position as will be described below in further detail.

Figure 6A:
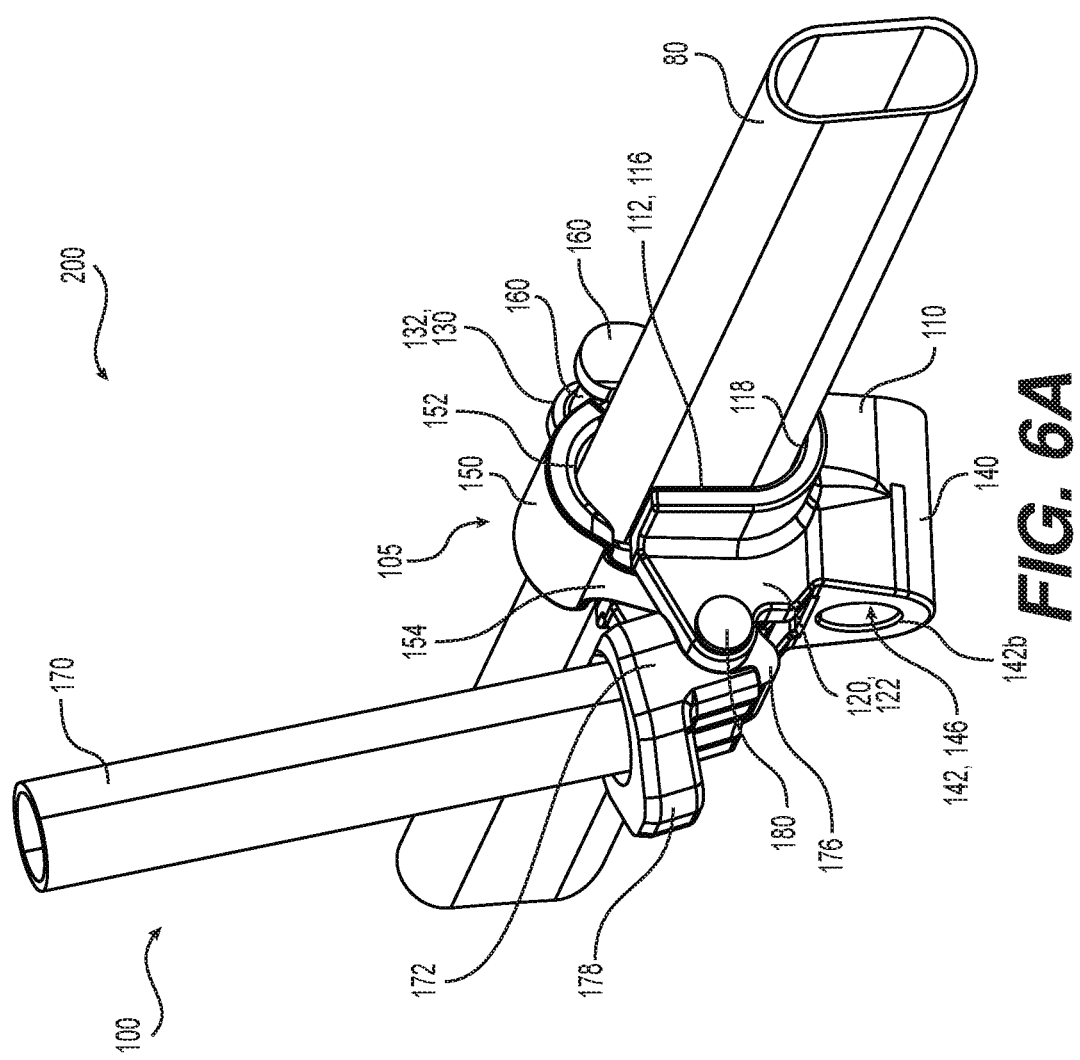
FIG. 6A is a perspective view, taken from a top, rear and left side, of the left footrest assembly and rail of FIG. 3 with the left footrest being disposed in an adjustment position.

The footrest 100 is pivotable about the footrest pivot axis 123 between a locked position (FIGS. 3, 4, and 7A) and an adjustment position (FIGS. 6A and 7C). The footrest 100 is coupled to the clamping member 105 such that rotating the footrest 100 about the footrest pivot axis 123 causes the clamping member 105 to rotate about the clamping member pivot axis 133. When the footrest 100 is in the locked position, the clamping member 105 is in a clamping position, and the footrest assembly 200 is fixed in position along the rail 80 as will be discussed below. When the footrest 100 is in the adjustment position, the clamping member 105 is in a releasing position and the position of the footrest assembly on the rail 80 is adjustable as will be discussed below.

Figure 3:
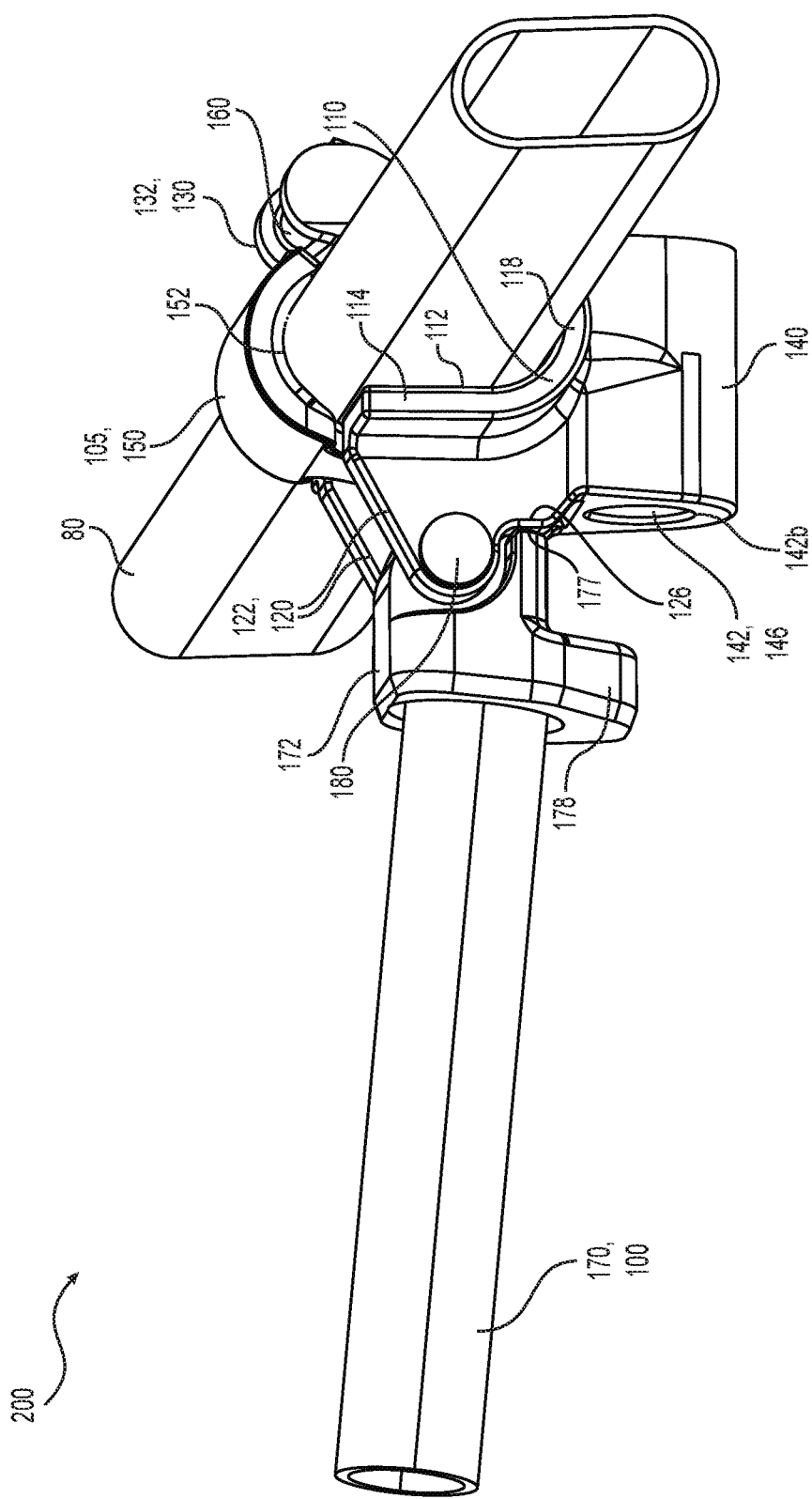
FIG. 3 is a perspective view, taken from a top, rear and left side, of the left footrest assembly of FIG. 1 mounted on a left rail similar to the left rail of FIG. 1 with the left footrest being disposed in a locked position.
Figure 4:
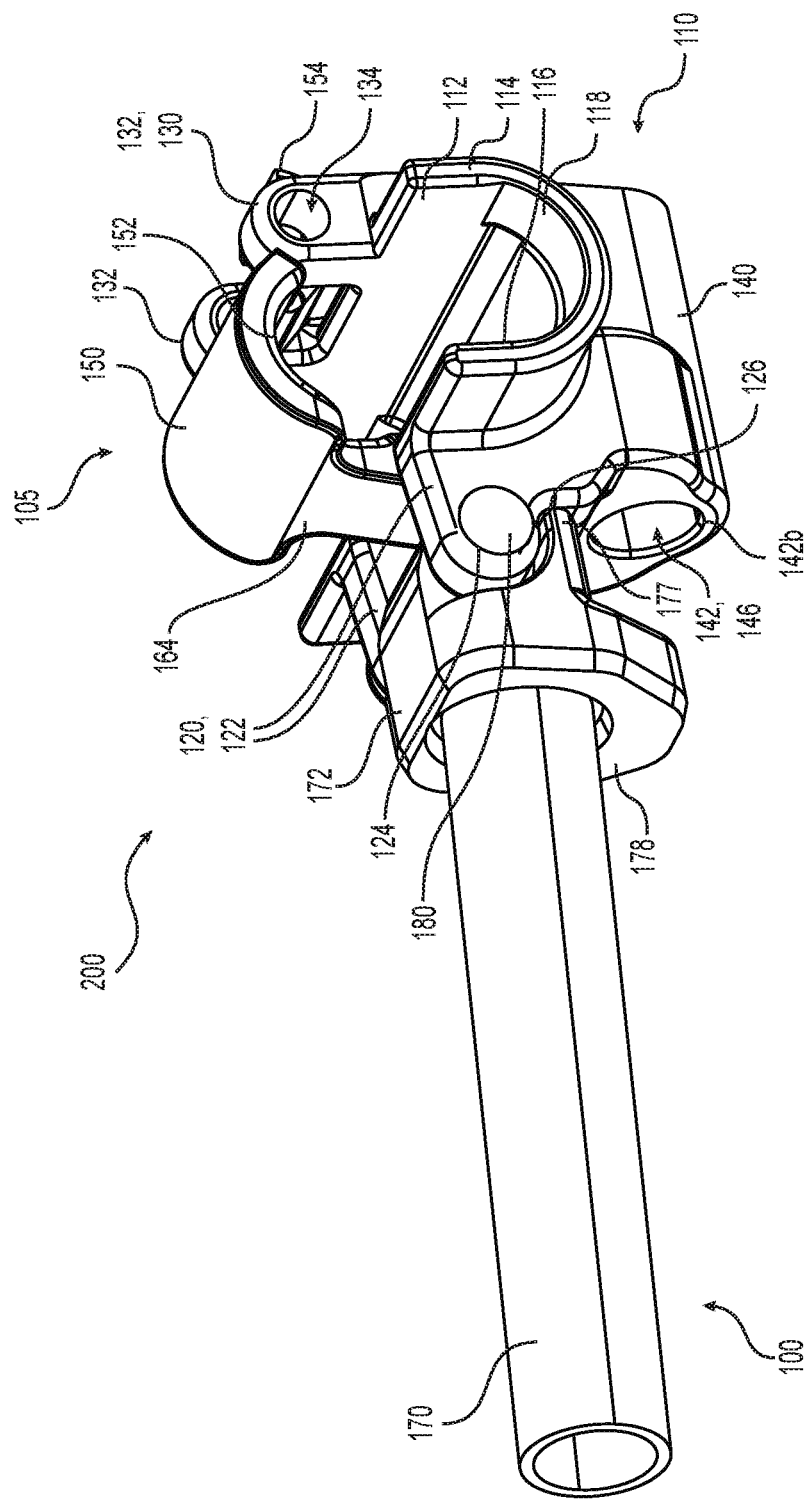
FIG. 4 is a perspective view, taken from a top, rear and left side, of the left footrest assembly of FIG. 3 with the rail removed.

In its locked position as seen in FIGS. 3, 4 and 7A, the footrest 100 extends laterally outwardly from the clamping member 105. The support member 170 extends laterally outwardly with respect to the pivot axis 123, the blocking member 178 extends downwardly with respect to the support member 170, and the cam surface 176 is disposed laterally inwardly of the footrest pivot axis 123 in engagement with the curved surface 166 of the clamping member 105. In its locked position, the cam surface 176 is disposed vertically lower than the footrest pivot axis 123. In the locked position of the footrest 100, a footrest stop 126 of the lever mounting bracket 120 of the rail mount 110 abuts the shoulder 177 of the mounting bracket 172 thereby limiting any further rotation of the footrest 100 in a downward direction (away from the clamping member pivot axis 133).

In the locked position of the footrest 100 and the corresponding clamping position of the clamping member 105, the cam surface 176 exerts pressure on the curved surface 166 of the clamping member 105, thereby pushing the footrest engaging bracket 164 onto the rail 80 and thereby the rail 80 against the laterally inner arm 114 of the rail mount 110 as well as pulling the central portion 150 towards the central portion 118 of the rail mount 110. In the locked position of the footrest 100 and the corresponding clamping position of the clamping member 105, the clamping member 105 exerts a clamping pressure on the rail 80 which is sufficient to clamp the rail 80 between the clamping member 105 and the rail mount 110 to prevent movement the footrest assembly 200 with respect to the rail 80.

In the clamping position of the clamping member 105, the cam surface 176 pushes onto the curved surface 166 of the clamping member 105 such that the inner surface 165 of the footrest engaging bracket 164 is disposed closer to the inner surface 112 of the laterally inner arm 114 of the rail mount 110 and the inner surface 152 of the central portion 150 of the clamping member 105 is disposed closer to the inner surface 112 of the central portion 118 of the rail mount 110 than in the releasing position of the clamping member 105.

In the adjustment position of the footrest 100, as can be seen in FIGS. 6A and 7C, the footrest 100 has been rotated in a clockwise direction (when viewed from the front) about the footrest pivot axis 123 such that the footrest 100 extends generally upwardly away from the rail mount 110 and the clamping member 105. In the adjustment position, the support member 170 extends generally upwardly away from the footrest pivot axis 123, and the blocking member 178 extends generally laterally outwardly with respect to the support member 170 and the footrest pivot axis 123. In the adjustment position, the cam surface 176 has been rotated about the footrest pivot axis 123 so as to be disposed vertically lower than the footrest pivot axis 123 and laterally outwardly thereof. The cam surface 176 is generally aligned with a lower surface of the rail 80.

In the adjustment position of the footrest 100 and the corresponding releasing position of the clamping member 105, the cam surface 176 is disposed laterally outwardly of the clamping member 105 and is not in contact with the surface 166 of the clamping member 105. As can be seen in FIG. 7C, in the releasing position, the clamping member 105 has rotated in a clockwise (when viewed from the rear) about the clamping member pivot axis 133 such that some portions of the inner surface 165 of the footrest engaging bracket 164 lose contact with the laterally outer surface of the rail 80 and portions of the inner surface 152 of the central portion 150 lose contact with the upper surface of the rail 80. In the adjustment position of the footrest 100 and the corresponding releasing position of the clamping member 105, the clamping member 105 is thus not exerting a clamping pressure on the rail 80. Thus, when the footrest 100 is in the adjustment position and the clamping member 105 is in the releasing position, the footrest assembly 200 is not fixed to the rail 80, and can be moved with respect to the rail 80.

In the illustrated implementation, in the adjustment position of the footrest 100 and the corresponding releasing position of the clamping member 105, a portion of the mounting bracket 172 (other than the cam surface 176) is in contact with the clamping member surface 166 which serves to limits the amount by which the clamping member 105 rotates about the clamping member pivot axis 133 and prevents the bracket 164 of the clamping member 105 from rotating upwards away from the rail 80. In the illustrated implementation, when the footrest 100 is in the adjustment position and the clamping member 105 is in the releasing position, the footrest assembly 200 is allows an operator to adjust the position of the footrest assembly 200 on the rail 80 without having to support the footrest assembly 200 while adjusting the position and without having to reassemble the footrest assembly 200 after moving the components thereof to the desired location on the rail 80.

When the footrest 100 is pivoted downwards from the adjustment position towards the locked position, the cam surface 176 of the footrest 100 comes into contact with the curved surface 166 of the clamping member 105. The cam surface 176 pushes the footrest engaging bracket 164 inwardly against the rail 80. The cam surface 176 and curved surface 166 are configured such that at an intermediate position (FIG. 7B) of the footrest 100 between the adjustment position (FIG. 7C) and the locked position (FIG. 7A), the cam surface 176 exerts a pressure on the clamping member bracket 164 that is greater than the pressure exerted thereon in the locked position. It takes a greater amount of force to move the footrest from the locked position to the intermediate position than to move the footrest from the intermediate position to the locked position. As such, the footrest 100 is stable in the locked position.

In the illustrated implementation, the rail 80 has a non-circular stadium-shaped cross section which prevents the footrest assembly 200 from rotating about the rail axis 81 when the footrest 100 is in the adjustment position. It is contemplated that the footrest assembly 200 could be used with a rail 80 having a circular cross-section by providing an additional structure such as a slot or a projection extending along the rail 80 parallel to the rail axis 82 and a complementary structure on the rail mount 110 for engaging the structure provided on the rail 80. It is also contemplated that the footrest assembly 200 could be used with a rail 80 having a circular cross-section without any additional structures to prevent rotation.

In the implementation described above, the components of the footrest assembly 200 are made of metal. It is however contemplated that one or more of the components could be made of plastic or other suitable material.

The configuration of the footrest assembly 200 above allows the footrest 100 to be adjusted to any position along the rail 80, and to perform the adjustment without the use of any tools.

The right footrest assembly 300 will now be described with reference to FIGS. 8A to 10B. The right footrest assembly 300 includes the right footrest 100, a rail mount 110, a clamping member 105 and the brake lever 304.

The footrest 100, the clamping member 105 and the rail mount 110 of the right footrest assembly 300 are similar to a mirror image of the footrest 100, the clamping member 105 and the rail mount 110 of the left footrest assembly 200. As such, corresponding features of the footrest 100, the clamping member 105 and the rail mount 110 have been labeled with the same reference numerals in the left and right footrest assemblies 200, 300 and will not be discussed again below except in respect of their differences.

The brake lever 304 is pivotably connected to the lever mounting bracket 140. As the brake lever 304 is mounted to the rail mount 110, the brake lever 304 moves with the rail mount 110 when the position of the rail mount 110 is adjusted along the rail 80. The footrest assembly 300 is thus easily repositioned along the rail 80 without the need for separately adjusting the position of the brake lever 304 with respect to the footrest 100 when the footrest 100 is repositioned.

The brake lever 304 is operatively connected to a hydraulic brake actuation system 310, and thereby to the brake assembly 47, for actuating the brakes 45. The brake lever 304 is pivotable about a lever pivot axis 143 defined by the passage 142 of the lever mounting bracket 140. The brake lever 304 has a rest position (zero position or unactuated position) corresponding to the brakes 45 of the brake assembly 47 being unactuated. The brake lever 304 can be pivoted from the rest position about the lever pivot axis 143 to a plurality of actuated positions corresponding to various actuated configurations of the brakes 45. A rest position of the brake lever 304 with respect to the rail mount 110 is also adjustable as will be described below.

The hydraulic brake actuation system 310 includes a hydraulic fluid reservoir 312, a master cylinder 314 and hydraulic brake lines (not shown) that fluidly connect the master cylinder 314 with the caliper 45b associated with each brake 45 in a known manner. The master cylinder 314 has a piston (not shown) which is connected to a piston rod 316 that can be seen extending out of the master cylinder 314. Moving the rod into and out of the master cylinder 314 causes an increase/decrease of hydraulic fluid pressure in the brake lines for controlling actuation of the brakes 45 as is known.

Figure 9:
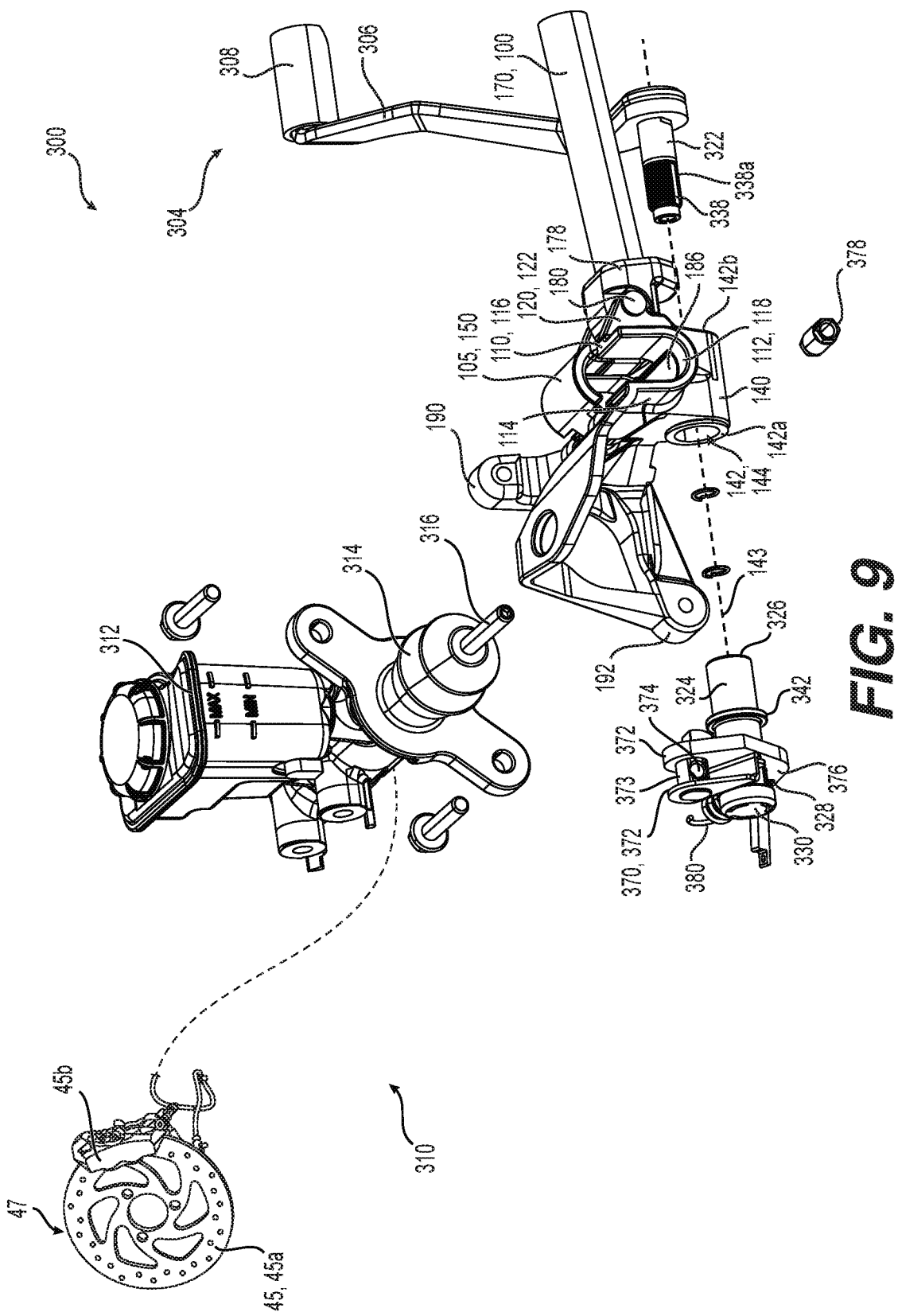
FIG. 9 is an exploded perspective view, taken from a rear, top and left side, of the right footrest assembly and hydraulic brake actuation system portion of FIG. 8A.

As best seen in FIG. 9, the rail mount 110 of the footrest assembly 300 has a hydraulic cylinder mounting bracket 190 extending upwardly from a front portion of the laterally inner arm 114 and a hydraulic cylinder mounting bracket 192 extending laterally inwardly from the laterally inner arm 114. The hydraulic cylinder 314 has two diametrically opposed brackets 318 extending outwardly from its outer surface. Each hydraulic cylinder mounting bracket 190, 192 is bolted to one of the brackets 318 of the hydraulic cylinder 314. The hydraulic cylinder 314 is thus mounted to the rail mount 110 and moveable therewith when a position of the footrest assembly 300 is adjusted along the rail 80.

The brake lever 304 has a lever arm 306 with a first end pivotably connected to the lever mounting bracket 140 and a second end having a peg 308 extending laterally outwardly therefrom. The lever arm 306 extends upwardly and forwardly from the lever mounting bracket 140 such that a driver can place the back portion of the right foot on the right footrest 100 and push on the peg 308 with the front portion of the right foot to pivot the lever arm 306 about a lever pivoting axis 143 and to thereby actuate the brakes 45.

As will be explained below, the right footrest assembly 300 includes a brake lever adjustment system 320 for adjustably pivotably connecting the brake lever 304 to the lever mounting bracket 140. As will be explained below, the brake lever adjustment system 320 allows adjusting of the rest position of the brake lever 304 with respect to the rail mount 310. In the illustrated implementation, the brake lever adjustment system 320 allows the brake lever to be connected to the rail mount 110 in five different rest positions, with each rest position having a plurality of corresponding actuated positions.

Figure 10A:
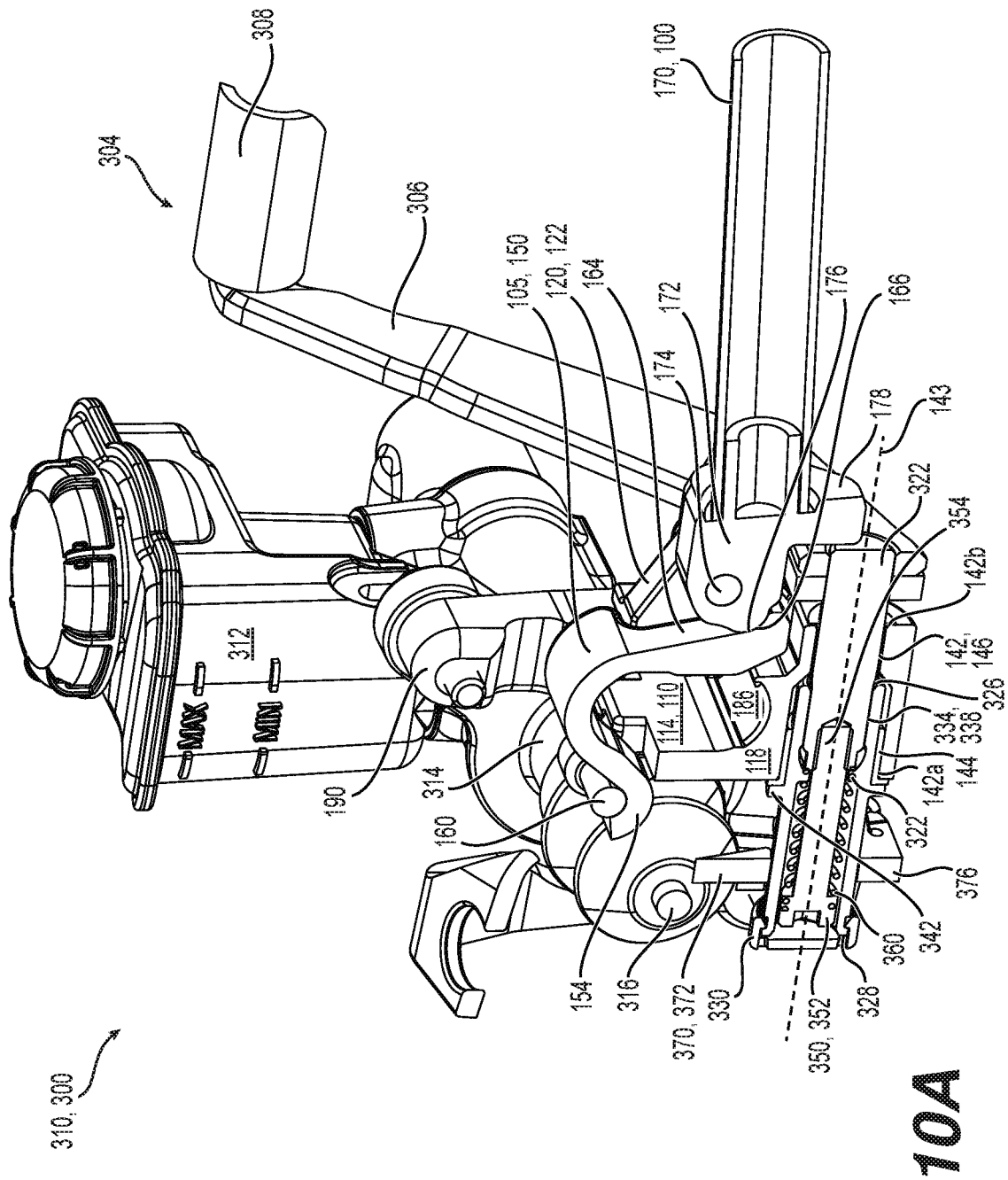
FIG. 10A is a cross sectional perspective view, taken from a rear, top and right side, of the right footrest assembly and hydraulic brake actuation system portion of FIG. 8A, taken along the line 10A-10A of FIG. 2.
Figure 10B:
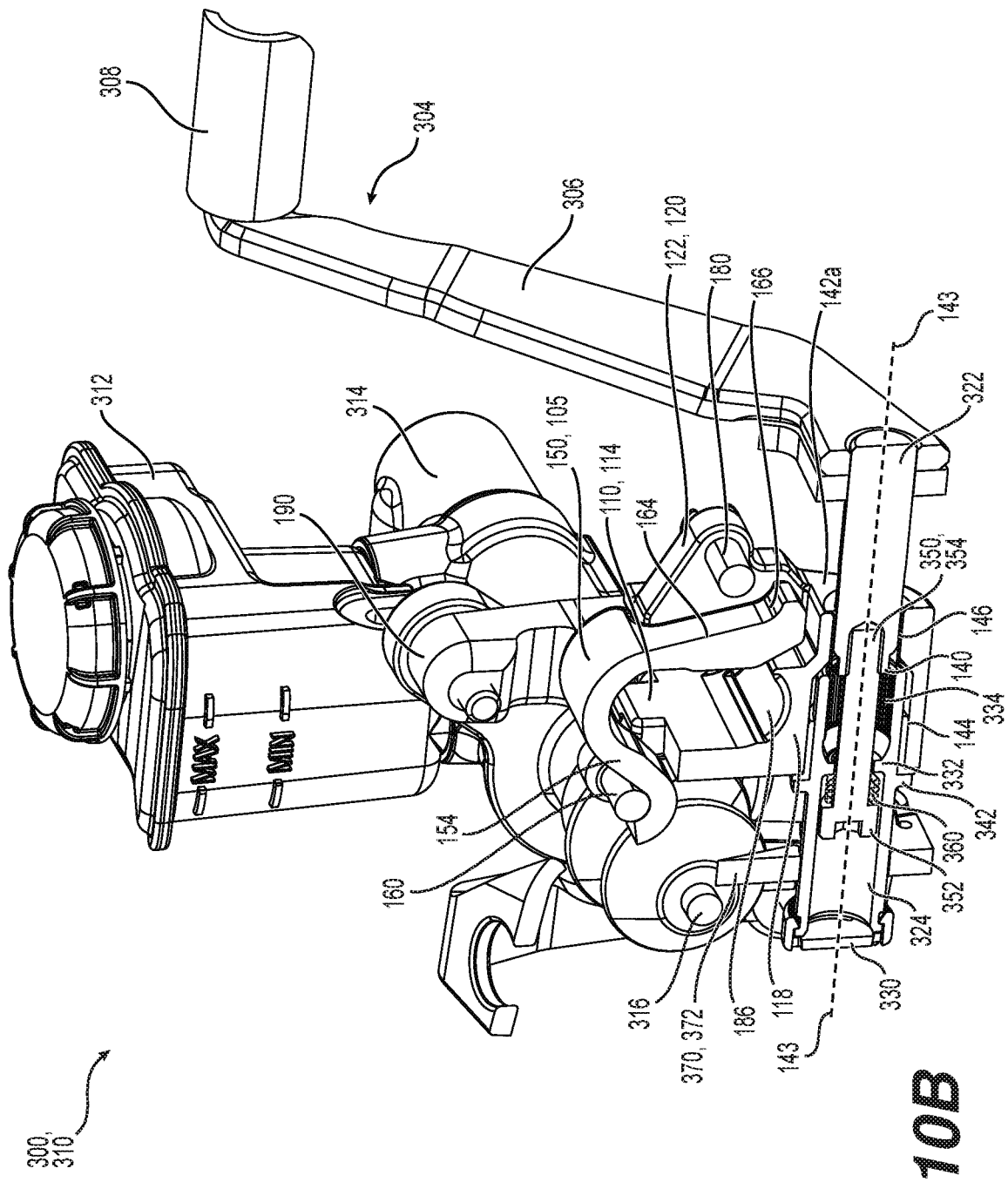
FIG. 10B is a cross sectional perspective view, taken from a rear, top and right side, of the right footrest assembly and hydraulic brake actuation system portion of FIG. 8A, taken along the line 10A-10A of FIG. 2, with the footrest being removed for clarity and showing a lever splined member being disengaged from a brake lever adjustment splined member.
Figure 11A:
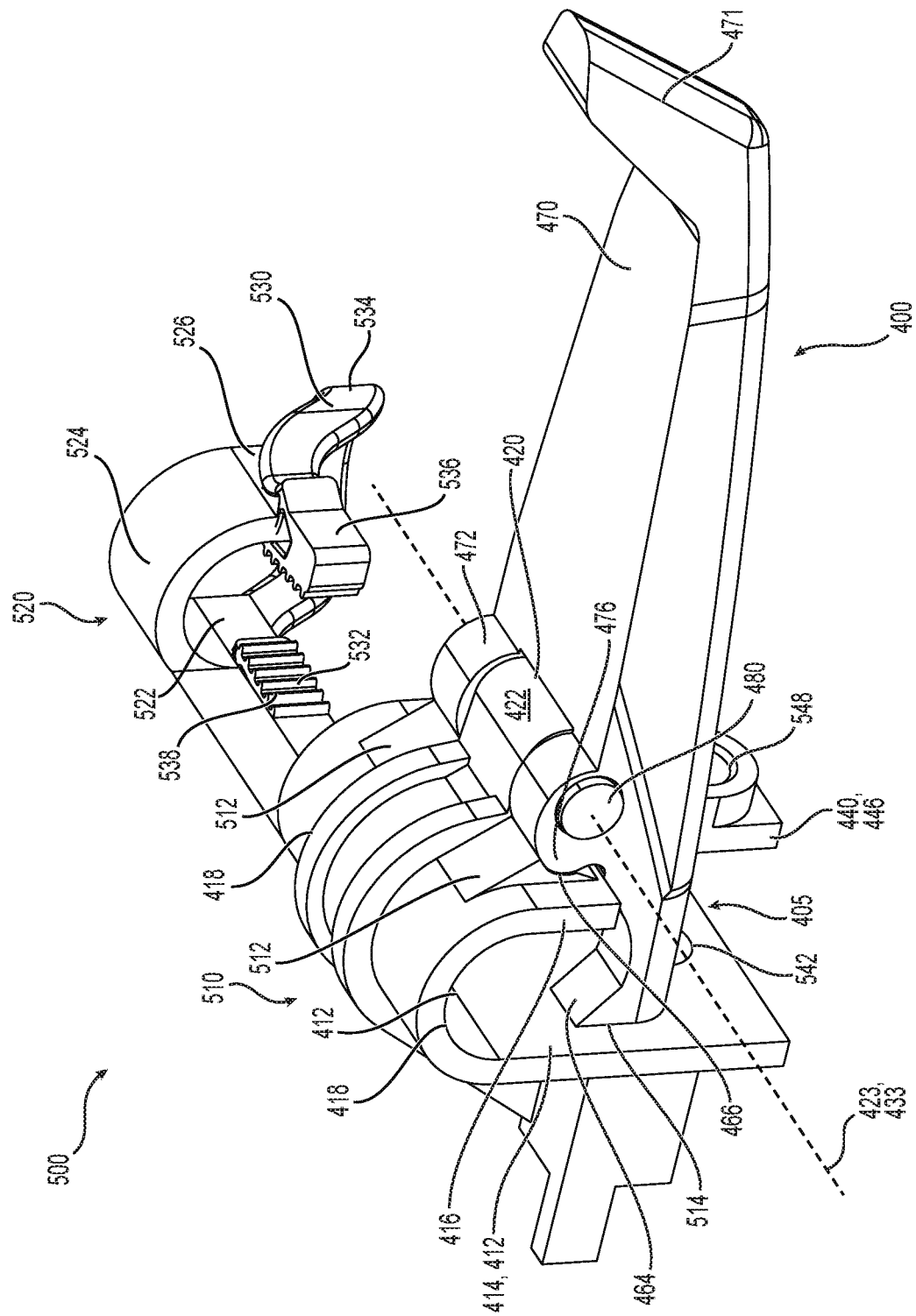
FIG. 11A is a perspective view of another implementation of a right footrest assembly, taken from a rear, top and right side, with the brake lever removed for clarity and the footrest being disposed in a locked position.
Figure 11B:
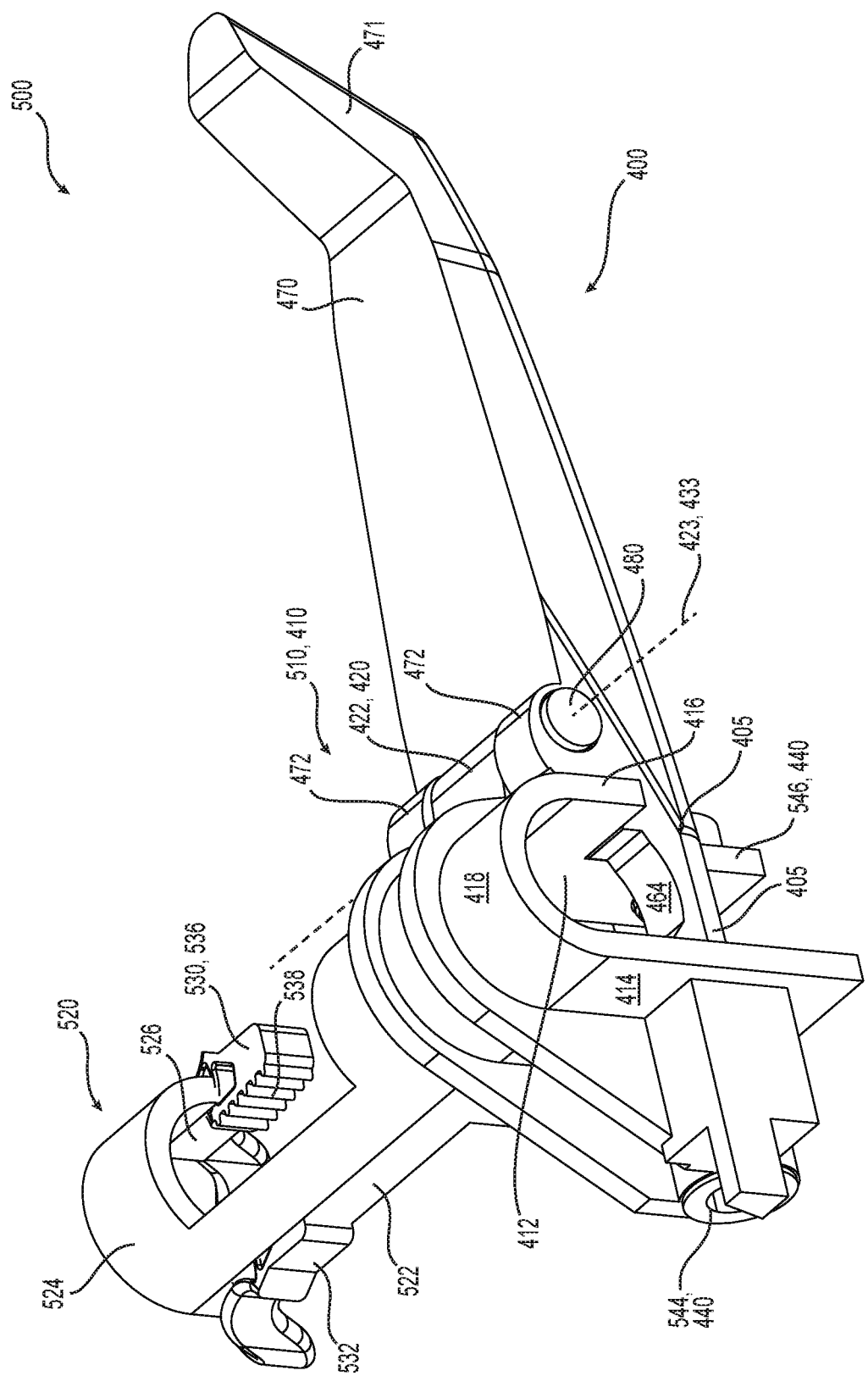
FIG. 11B is a perspective view, taken from a rear, top and left side, of the right footrest assembly of FIG. 11A.
Figure 11C:
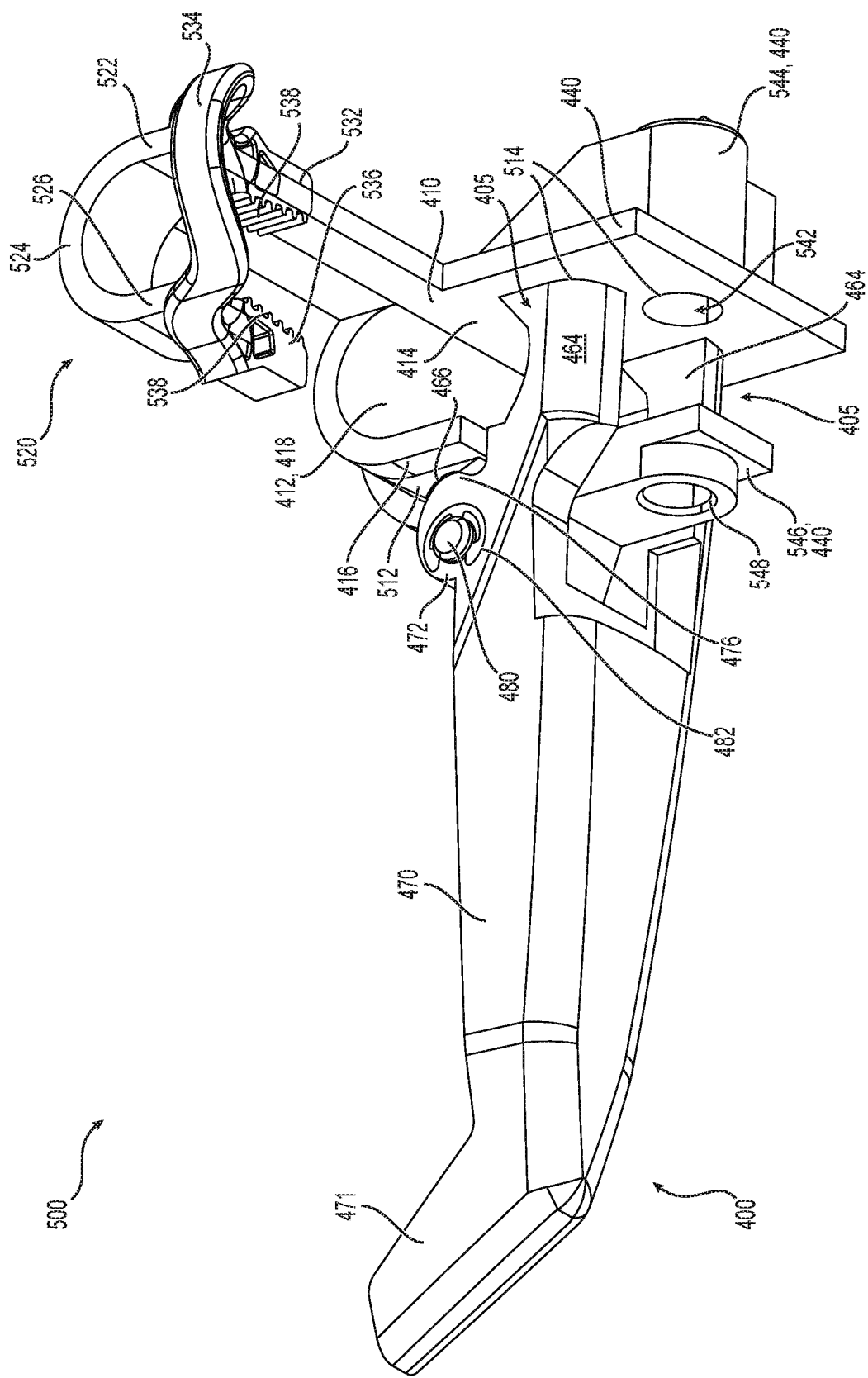
FIG. 11C is a perspective view, taken from a front, bottom and right side, of the right footrest assembly of FIG. 11A.
Figure 11D:
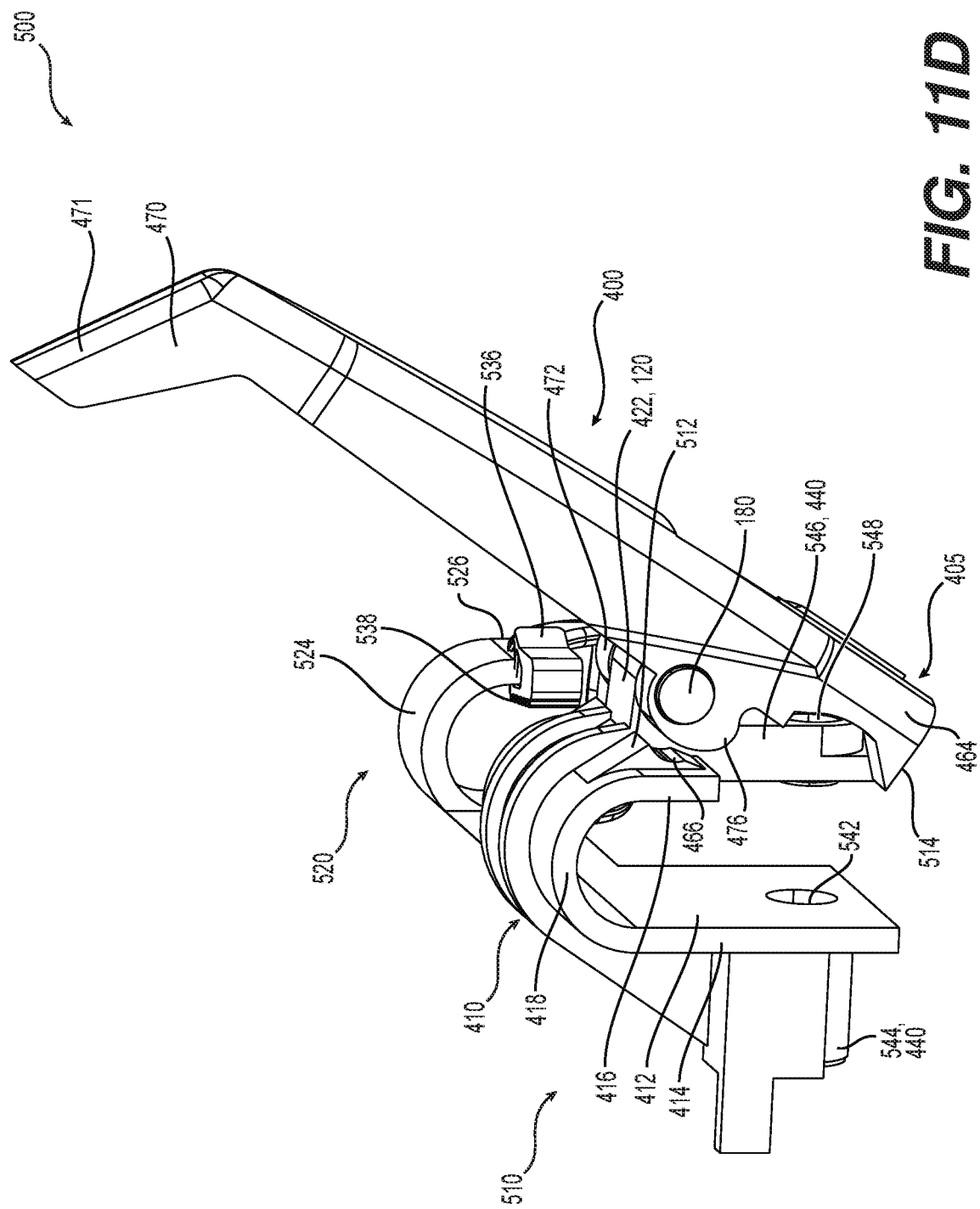
FIG. 11D is a perspective view, taken from a rear and right side, of the right footrest assembly of FIG. 11A with the footrest being disposed in an adjustment position.
Figure 12:
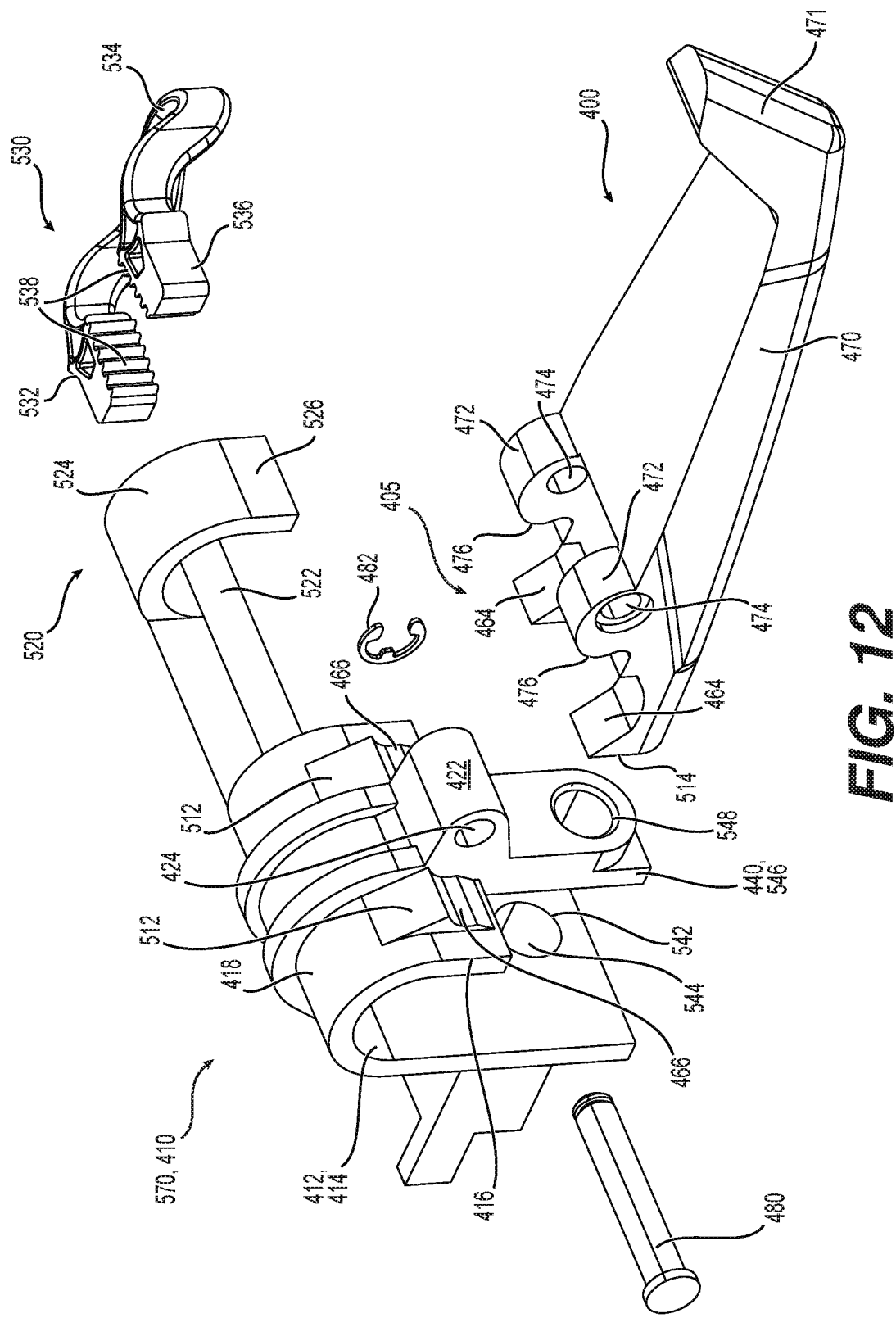
FIG. 12 is an exploded taken from a rear, top and right side, of the right footrest assembly of FIG. 11A.
Figure 13:
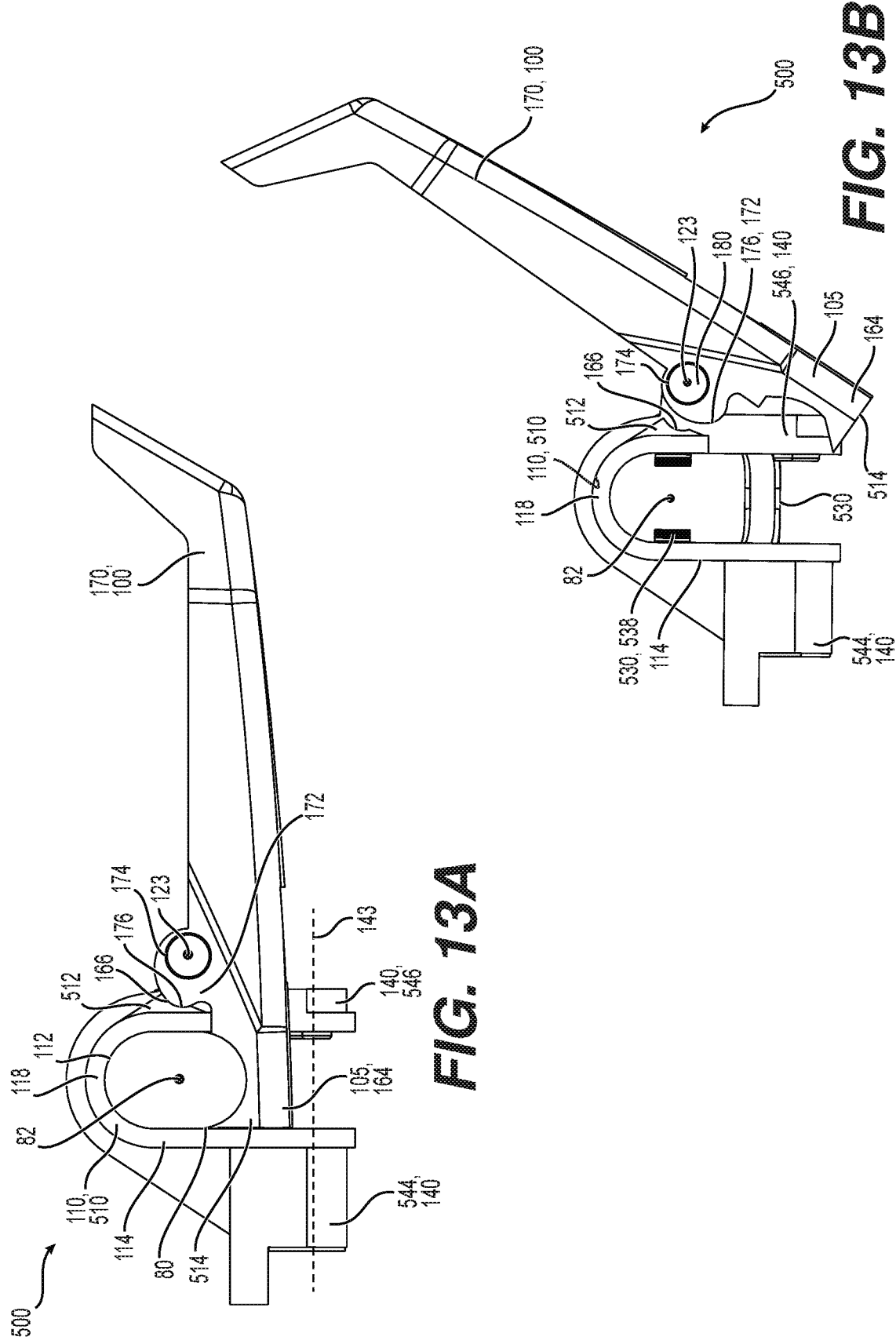
FIG. 13A is a rear elevation view of the right footrest assembly of FIG. 11A with the footrest being disposed in the locked position on a rail.
FIG. 13B is a rear elevation view of the right footrest assembly of FIG. 11D with the footrest being disposed in the adjustment position with the rail removed.

With reference to FIGS. 9, 10A and 10B, the brake lever adjustment system 320 includes a lever splined member (LSM) 322 connected to the lower end of the lever arm 306. The LSM 322 extends laterally inwardly from a laterally inwardly facing surface of the lower end of the lever arm 306. The LSM 322 is in the form of a shaft having axially extending splines 338 on its exterior surface. An opening 340 extends axially into the LSM 322 from its end opposite the lever arm 306.

The LSM 322 engages a brake lever adjustment splined member (BLASM) 324 for actuating the brakes 45 via the brake actuation system 310. The BLASM 324 is a tubular member having axially extending splines 334 formed along an interior surface thereof.

The BLASM 324 has an outer end 326 that is open and receives therethrough the LSM 322. An inner end 328 of the BLASM 324 is also open but capped by a cover 330. The cover 330 can be removed for assembly and disassembly of the brake lever 304 with the brake adjustment system 320. A circumferential shoulder 342 projects radially outwardly from the exterior surface of the BLASM 324. As can be seen in FIGS. 10A and 10B, the portion of the BLASM 324 between the shoulder 342 and the outer end 326 is rotatably disposed in the inner portion 144 of the passage 142 of the lever mounting bracket 140. The shoulder 342 abuts the wall of the lever mounting bracket 140 adjacent the inner opening 142a.

As can be seen in FIGS. 10A and 10B, a circumferential shoulder 332 projects radially inwardly from the interior surface of the BLASM 324 between the inner and outer ends 328, 326. The interior surface of the BLASM 324 between the shoulder 332 and the outer end 326 has the axially extending splines 334 formed thereon as can be seen in FIG. 10B. As can be seen in FIG. 10A, the LSM 322 extends through the outer opening 142b through the outer passage 146 of the lever mounting bracket 140 into the tubular BLASM 324 through the outer end 326 thereof. The LSM splines 338 are engaged by the BLASM splines 334. The end of the LSM 322 abuts the shoulder 332. A bolt 350 is received in the threaded opening 340 of the LSM 322. The bolt 350 extends from the LSM 322 past the BLASM shoulder 332 towards the inner end 328 of the BLASM 322. The head 352 of the bolt 350 is disposed adjacent the inner end 328. A spring 360 extends around the shaft 354 of the bolt 350. One end of the spring 360 abuts the shoulder 332 while the opposite end of the spring 360 abuts the bolt head 352. The spring 360 and the bolt 350 serve to bias the LSM 322 to remain inside the BLASM 324 with the LSM splines 338 engaging the BLASM splines 334. In addition, when the footrest 100 is disposed in the locking position, the lever blocking member 178 is disposed laterally outwardly of the lower end of the lever arm 306. The lever blocking member 178 prevents the LSM 322 from being inadvertently pulled laterally outwardly away from the BASM 324, for example, when the driver is pushing downward on the peg 308.

Figure 8B:
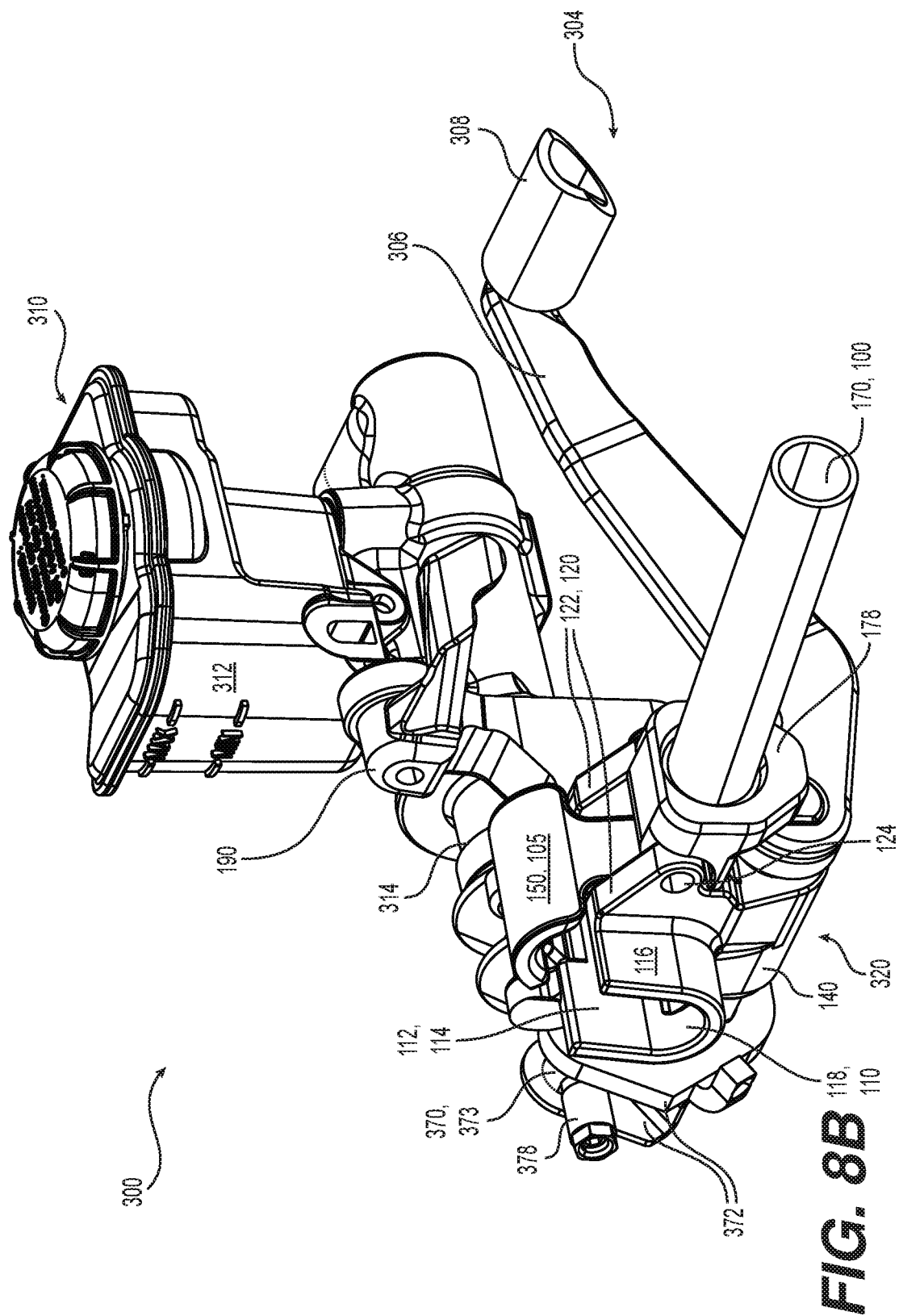
FIG. 8B is a perspective view, taken from a rear and right side, of the right footrest assembly and hydraulic brake actuation system portion of FIG. 8A showing the brake lever disposed in a second rest position.
Figure 8C:
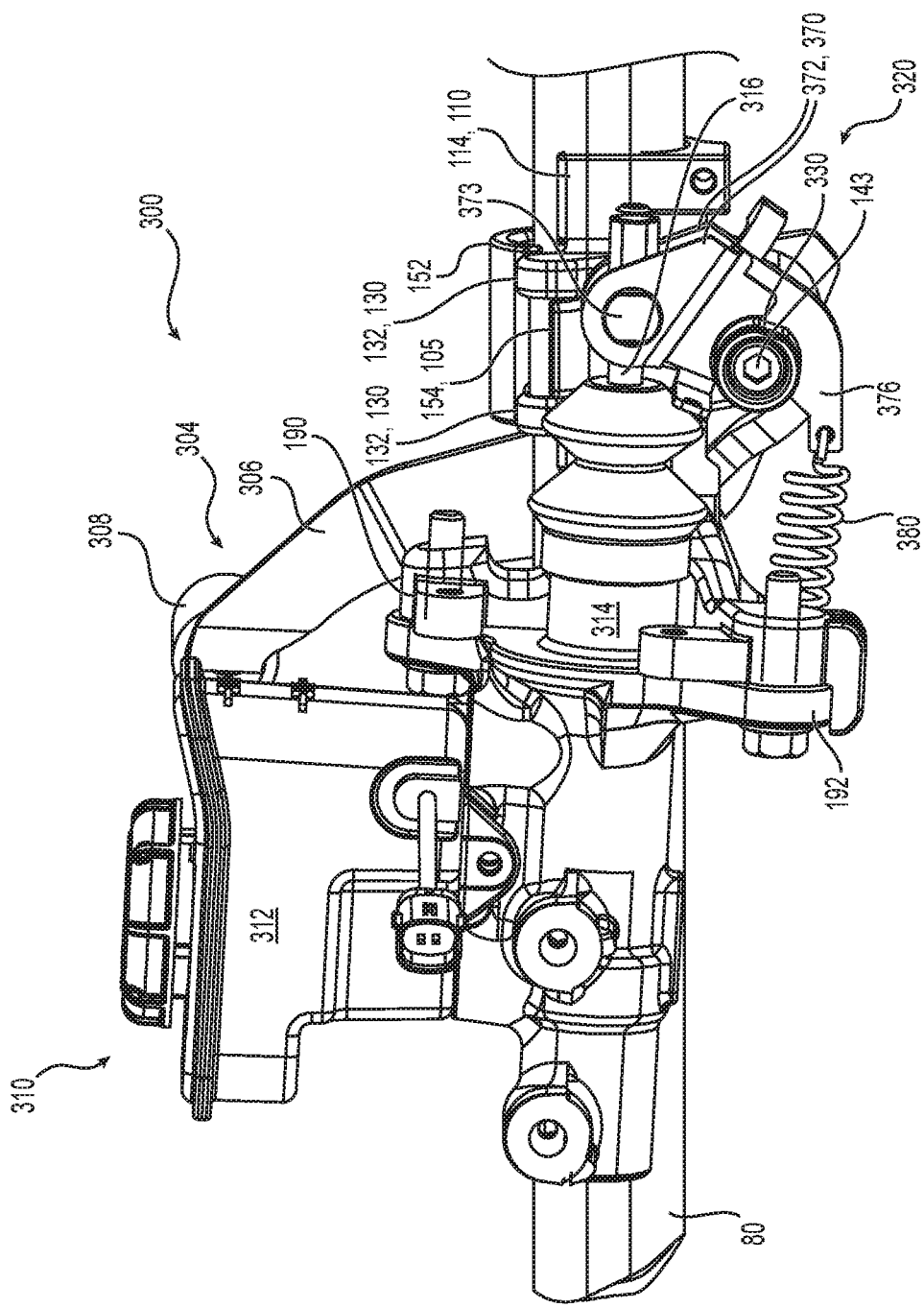
FIG. 8C is a left side elevation view of the right footrest assembly and hydraulic brake actuation system portion of FIG. 8A, showing the brake lever disposed in the first rest position and including the rail.

With reference to FIGS. 8C and 9, a bracket 370 is connected to the exterior surface of the BLASM 324 laterally outwardly of the shoulder 342. In the illustrated implementation, the bracket 370 is integrally formed with the BLASM 324 but it is contemplated that the bracket 370 could be formed separately and fixed to the BLASM 324. The bracket 370 has two tabs 372 extending upwards from the upper portion of the BLASM 324 (when the brake lever 304 is not actuated). A bridge 373 extending between the tabs 372 has an aperture 374 defined therethrough. The master cylinder piston rod 316 extends through the aperture 374 and is fixed to the bracket 370 by an internally threaded nut 378 inserted around the externally threaded end of the piston rod 316. As the bracket 370 is fixed to the BLASM 322, rotation of the BLASM 324 about the lever pivot axis 143 causes the piston rod 316 to move into or out of the master cylinder 314.

When the peg 308 is pushed downwardly and forwardly, the lever arm 306, the LSM 322 and the BLASM 324 rotate in a clockwise direction when viewed from a laterally outer side of the vehicle 10 (from the side of the footrest assembly 300 having the footrest 100 and the brake lever 304). When the BLASM 324 rotates in clockwise direction as viewed from a laterally outer side of the vehicle 10, the bracket tabs 372 move forwardly with respect to the rail mount 110 causing the piston rod 316 to move into the master cylinder 314 thereby increasing hydraulic pressure in the brake lines connected to the master cylinder 314. The actuation of the brake lever 304 by the driver's foot thereby causes an actuation of the brakes 45 connected to the wheels 14, 16.

With reference to FIGS. 8C and 9, the bracket 370 has a tab 376 extending downwards and forwards from a lower portion of the BLASM 324 (when the brake lever 304 is not actuated). A spring 380 has one end connected to the tab 376 and another end connected to the master cylinder mounting bracket 392. The spring 380 is in an unstretched configuration when the brake lever 304 is not actuated. When the brake lever 304 is actuated, causing the BLASM 324 to rotate clockwise as viewed from a laterally outer side of the vehicle 10, the tab 376 moves away from the hydraulic cylinder mounting bracket 392 thereby stretching the spring 380. The stretched spring 380 exerts a restoring force on the tab 376 towards the hydraulic cylinder mounting bracket 392. When the driver of the vehicle 10 stops pushing on the peg 308 of the brake lever 304, the tab 376 is pulled forward by the restoring force of the spring 380 which causes the BLASM 324 to rotate counterclockwise about the lever pivot axis 143, and the lever 304 to return to its unactuated position. The spring 380 therefore biases the brake lever 304 to its unactuated or rest position.

In the illustrated implementation, the rest position of the brake lever 304 can be adjusted by adjusting the engagement of the BLASM 324 with the LSM 322.

As can be seen in FIG. 10B, the LSM 322 (with the brake lever 304 attached thereto) can be pulled out of the BLASM 324 such that LSM splines 338 are disengaged from the BLASM splines 334. As can be seen in FIGS. 8A and 8B, when the footrest 100 is in a locked position, the blocking member 178 is disposed laterally outwardly of the lower end of the brake lever 304 such that the LSM 324 cannot be pulled out of the BLASM 324. Thus, the footrest 100 has to be moved to the adjustment position as in FIG. 6A in order to pull the LSM 324 out of the BLASM 324. When the footrest 100 is moved from the locked position to the adjustment position, the blocking member 178 pivots about the footrest pivot axis 123 away from the opening 142b and the lower end of the lever arm 306 (as can be seen best in FIG. 7C) thereby allowing the lever arm 306 to be moved away from the rail mount, and the LSM 322 to be moved away from the BLASM 324 for disengaging the LSM splines 338 from the BLASM splines 334. When the LSM splines 338 are disengaged from the BLASM splines 334, the brake lever 304 can be rotated about the lever pivot axis 143 to define a new rest position and then the LSM 322 can be reinserted into the BLASM 324 so as to reengage the LSM splines 338 with the BLASM splines 334. When the LSM 322 is disengaged from the BLASM 324, the BLASM 324 remains in a BLASM rest position which is determined by the unstretched configuration of the spring 380. The rest position of the brake lever 304 is defined by the position of the brake lever 304 when the LSM 322 is reengaged with the BLASM 324 with the BLASM 324 being disposed in the BLASM rest position. The spring 360 biases the LSM 322 to be reinserted into the BLASM 324 and also biases the brake lever arm 306 towards an operational configuration where the lever arm 306 abuts the lever mounting bracket 140.

The rest position of the brake lever 304 can thus be adjusted with respect to the rail mount 110 when the footrest 100 is in the adjustment position by disengaging the LSM 322 from the BLASM 324 while the BLASM 324 is disposed in the rest position, rotating the brake lever 304 about the lever pivot axis 143 to a desired rest position for the brake lever 304, and then reengaging the LSM 322 with the BLASM 324 with the BLASM 324 being disposed in the BLASM rest position. The footrest 100 cannot be returned to the locked position until the LSM 322 is reengaged with the BLASM 324.

In the illustrated implementation, as can be seen in FIG. 9, the LSM 322 has a spline 338a that extends further in a radial direction than the other splines 338. Although not shown, the BLASM 324 is configured to receive the larger spline 338a in one of five different interspline valleys. Thus, the LSM 322 can be engaged by the BLASM 324 in one of five different angular positions about the pivot axis 143. It is however contemplated that the BLASM 324 and LSM 322 could be configured to allow more or less than five different rest positions for the brake lever 304.

It is contemplated that instead of an LSM 322 and BLASM 324 having complementary splines, the brake adjustment system 320 could comprise a first engagement member 322 and a second engagement member 324 having cross-sections of complementary geometric shapes or including complementary geometric structures. For example, the first engagement member 322 and the second engagement member 324 could have cross-sections that are hexagonal, or square and the like. As another example, one of the first and second engagement members 322, 324 could have a key and the other of the first and second engagement members 322, 324 could have a complementary notch for mutual engagement. As a further example, one of the first and second engagement members 322, 324 could have a key and the other of the first and second engagement members 322, 324 could have a plurality of complementary notches for receiving the key corresponding to a plurality of mutual engagement positions defining a plurality of rest positions for the brake lever 304.

In general, the first and second engagement members 322, 324 are configured to be selectively mutually engaged, one of the first and second engagement members 322, 324 is connected to the lever 304 and at least one of the first and second engagement members 322, 324 is moveable with respect to the lever mounting bracket 140 along the lever pivot axis 143 for selective engagement and disengagement. The first engagement member 322 is disengaged from the second engagement member 324 by moving one of the first and second engagement members 322, 324 away from the other of the first and second engagement members 322, 324 at least along the lever pivot axis 143. The lever blocking member 178 is pivotable with one of the footrest 100 and the clamping member 105 about the corresponding pivot axis 123, 133. The lever pivot axis 143 generally extends laterally and perpendicular to the rail axis 82, while each of the footrest and clamping member pivot axes 123, 143 extending generally perpendicular to the lever pivot axis 143. The lever blocking member 178 is generally configured to block relative movement between the first and second engagement members 322, 324 along the lever pivot axis 143 when the footrest 100 is in the locked position and the clamping member 105 is in the clamping position such that the first and second engagement members 322, 324 cannot be mutually disengaged. The lever blocking member 178 is generally configured to allow relative movement between the first and second engagement members 322, 324 along the lever pivot axis 143 when the footrest 100 is in the adjustment position and the clamping member 105 is in the releasing position such that the first and second engagement members 322, 324 can be mutually disengaged.

With reference now to FIGS. 11A to 13B, another implementation of a footrest assembly 500 will now be described. In the Figures shown herein, the footrest assembly 500 is a right footrest assembly 500 for supporting a driver's right foot but it should be understood that a left footrest assembly would be similar to a mirror image of the right footrest assembly 500 shown herein.

The footrest assembly 500 has some features that are similar to corresponding features of the footrest assemblies 200 and 300 discussed above. Features of the footrest assembly 500 that are similar to corresponding features of the footrest assemblies 200, 300 have been labeled with the same reference numerals.

The footrest assembly 500 includes a footrest 400, a clamping member 405 and a rail mount 410.

The rail mount 410 has a rear portion 510 and a front portion 520 connected thereto. The rear portion 510 is configured for connection of the footrest 100, the clamping member 405 and the brake lever 304. The rear portion 510 of the rail mount 110 defines a surface 412 facing towards the rail 80 and being complementary to an outer surface of the rail 80. In the illustrated implementation, the surface 412 forms a U-shaped cross-section when viewed along the rail axis 82 in order to be complementary to the rail 80 of the illustrated implementation having a stadium-shaped cross-section. The U-shaped surface 412 is defined by a laterally inner arm 414 extending along a laterally inner side of the rail 80, a laterally outer arm 416 extending along a laterally outer side of the rail 80, and a central portion 418 extending between the laterally inner arm 414 and the laterally outer arm 416. In the illustrated implementation, the central portion 418 extends along an upper surface of the rail 80. In the rear portion 510, the laterally inner arm 414 extends further downward than the laterally outer arm.

The rear portion 510 has a footrest mounting bracket 420 in the form of a projection 422 extending laterally outwardly from the laterally outer arm 116 near the lower edge thereof. The projection 422 has an aperture 424 extending therethrough. The projection 422 is disposed between a pair of cam engaging projections 512. Each cam engaging projection 512 has a curved surface 466 for engaging a cam surface 176 of the footrest 400.

The rear portion 510 includes a tubular member 544 extending laterally inwardly from an opening 542 defined in the lower portion of the laterally inner rail mount arm 414. A bracket 546 extends downwards from the lower edge of the laterally outer arm 116 below the projection 422. The bracket 546 defines an aperture 548 extending therethrough. The bracket 546 is formed integrally with the projection 422 but it is contemplated that the bracket 546 could not be integrally formed and/or connected to the projection 422. The aperture 548 is coaxial with the opening 542, and the tubular member 544. The apertures 548, 542, and the tubular member 544 are used to receive therethrough the BLASM 324, and the LSM 322 described above for pivotably connecting the brake lever 304 to the rail mount 410 such that the brake lever 304 would be pivotable about a lever pivot axis 443 (FIG. 13A) defined by the coaxial apertures 542, 548 and the tubular member 544. The bracket 546 and the tubular member 544 therefore form a lever mounting bracket 440 of the footrest assembly 500 similar to the lever mounting bracket 140 of the footrest assemblies 200, 300.

The front portion 520 of the rail mount 410 is spaced from the rear portion 510 and is used for connection of a handle 530 to facilitate sliding of the rail mount 410 along the rail 80. The front portion 520 is U-shaped similar to the rear portion 510. The front portion 520 comprises a laterally inner rail mount arm 522 extending forwardly from the laterally inner arm 414 of the rear portion 510 and extending along a laterally inner surface of the rail 80. A central portion 524 extends from the laterally inner portion 522 along the upper surface of the rail 80 to a laterally outer rail mount arm 526 which extends downwardly from the central portion 524 along the laterally outer surface of the rail 80. The front portion 520 has an inner surface 528 facing towards the rail 80 and an outer surface 529 facing away from the rail 80.

The handle 530 is connected to the laterally inner and outer rail mount arms 522, 526. The handle 530 is generally U-shaped and made of a resilient material such that pulling on the handle 530 stretches the handle 530 and returns to its unstretched configuration when the pulling force is removed. The U-shaped handle 530 has an inner handle arm 532 extending around a lower edge of the laterally inner rail mount arm 522, an outer handle arm 536 extending around a lower edge of the laterally outer rail mount arm 526 and a central handle portion 534 connecting the arms 532, 536. Each handle arm 532, 536 is in the form of a sleeve extending around the lower edge of its corresponding rail mount arm 522, 526. The outer handle arm 532 also extends around a rear edge of the rail mount arm 526. In each handle arm 532, 536, the portion 538 extending along the inner surface 528 of the corresponding rail mount arm 522, 526 is grooved. The grooved portions 528 are each disposed between the rail 80 and the corresponding rail mount arm 522, 526. The grooved portions 538 provide traction between the rail mount 410 and the rail 80 preventing movement of the rail mount 410 with respect to the rail 80. The central handle portion 534 extends forwardly from the arms 532, 536 and downwardly under the rail 80. The central handle portion 534 can be pulled for moving the rail mount 410 along the rail 80. When the handle 530 is pulled so as to be stretched, the thickness of the handle 530 especially in the grooved portions 538 of the arms 532, 536 decreases, reducing traction between the rail mount 410 and the rail 80, and facilitating movement of the rail mount 410 along the rail 80. It is contemplated that the footrest assemblies 200, 300 could also be provided with a front portion similar to the front portion 520.

With reference to FIGS. 11A to 11C and 13A which show the footrest 400 in a locked position, the footrest 400 has an elongated support member 470 extending generally laterally for supporting a driver's foot. A laterally outer end of 471 of the support member 470 extends upwardly. The support member 470 has a generally rectangular cross-section with a planar upper surface for supporting the driver's right foot. Two spaced apart mounting brackets 472 are formed near a laterally inner end of the support member 470. The mounting brackets 472 extend upwardly from the upper surface of the support member 470. The projection 422 of the footrest mounting bracket 420 of the rail mount 410 is disposed between two spaced apart mounting brackets 472. The outer surface of each mounting bracket 472 facing laterally inwardly away from the free end 471 of the support member 470 is in the form of a cam surface 476 configured to engage the cam engaging projections 512 disposed on either side of the projection 422. Each mounting bracket 472 has an aperture 474 that is aligned with the aperture 424 of the projection 422. A pin 480 is inserted through the aligned apertures 424, 474 to pivotably connect the footrest 100 to the rail mount 410. A circlip 482 is inserted around the free end of the pin 480 extending out of the mounting bracket 472 opposite the bolt head to retain the footrest 400 on the rail mount 410.

A footrest pivot axis 423 (FIGS. 13A and 13B) is defined by the coaxial central axes of the apertures 424, 474 and the pin 480. In the illustrated implementation, the footrest pivot axis 423 is parallel to the central axis 82 of the rail 80, and disposed on a laterally outer side of the rail 80. In a cross-section taken along a plane normal to the rail axis 82, the footrest pivot axis 423 is disposed vertically between the upper and lower surfaces of the rail 82 and generally aligned with the rail axis 82 in the vertical direction. The footrest pivot axis 423 is generally aligned in the vertical direction with the upper surface of the support member 470.

In the implementation of the footrest assembly 500 of FIGS. 11A to 13B, the clamping member 405 is rigidly connected to the footrest 400. As the clamping member 405 is rigidly connected to the footrest 400, when the footrest 400 is in the adjustment position, the clamping member 405 is in a releasing position and when the footrest 400 is in the locked position, the clamping member 405 is in a clamping position.

The clamping member 405 includes two spaced apart arms 464. With reference to FIGS. 11A to 11C and 13A which show the footrest 400 and the clamping member 405 in the locked and clamping positions respectively, each arm 464 of the clamping member 405 extends laterally inwardly from the support member 470 below a corresponding one of the mounting brackets 472. Each arm 464 has a planar end 514. Each arm 464 extends downwardly and forwardly from the corresponding mounting bracket 472. An upper surface of each clamping member arm 464 is U-shaped in cross-section so as to conform to the U-shaped lower surface of the rail 80 having the stadium-shaped cross-section. The lower surface of each arm 464 is formed continuously with the lower surface of the support member 470 of the footrest 100. The support member 470 and the clamping member arms 164 thus extend on opposite sides of the footrest pivot axis 423. In this implementation of the footrest assembly 500 of FIGS. 11A to 13B, as the clamping member 405 is pivotably connected to the rail mount 410 by the mounting brackets 470 and the projection 422, the footrest pivot axis 423 is also the clamping member pivot axis 433. In the illustrated implementation, the clamping member 405 is integrally formed with the support member 470 and the mounting brackets 472. It is however contemplated that the clamping member 405, the support member 470 and the mounting brackets 472 could not be integrally formed.

With reference to FIG. 13A, when the footrest 400 is in the locked position and the clamping member 405 is in the clamping position, the support member 470 extends laterally outwardly with respect to the rail 80, the cam surfaces 176 of the mounting brackets 472 engage the cam engaging surfaces 466 of the cam engaging projections 512, and the clamping member 405 is disposed under the rail 80 opposite the central portion 418 of the rail mount 410. In the clamping position, the planar end 514 of the clamping member arms 464 abut the planar inner surface 412 of the laterally inner arm 414 of the rail mount 410.

When the footrest 400 is in the locked position and the clamping member 405 is in the clamping position, the clamping member 405 is in contact with the lower surface of the rail 80 and exerts an upward pressure on the rail 80 towards the central portion 418 of the rail mount 410, which exerts a corresponding downward pressure on the rail 80. The cam surfaces 476 of the mounting brackets 472 push laterally inwardly against the cam engaging projections 512. The pressure exerted by the cam surfaces 476 on the projections 512 results in the laterally outer arm 416 of the rail mount 410 exerting a pressure on the rail 80 towards the laterally inner arm 414. The upward pressure exerted by the clamping member 105 on the lower surface of the rail 82 and the laterally inwardly directed pressure exerted by the laterally outer arm 416 on the rail 80 keep the rail mount 410 clamped to the rail 80. Thus, in this implementation, the clamping pressure on the rail 80 is exerted in part directly by the clamping member 405, and in part indirectly by the clamping member 405 via the rail mount 410.

The engagement of the cam surfaces 476 with the curved surfaces 466 keeps the footrest 400 in the locked position as a considerable force is needed to move the curved cam surface 476 past the curved cam engaging surface 466. In addition, the planar end 514 of the clamping member 105 abutting the inner surface 412 of the rail mount inner arm 414 also serves to keep the clamping member 405 in the clamping position, as a considerable force would be required to rotate the clamping member 405 from the clamping position of FIG. 13A towards the releasing position of FIG. 13B. In order to rotate the clamping member 405 about the footrest pivot axis 423, in a counter-clockwise direction (as viewed from the rear as in FIG. 13A) from the clamping position, the upper corner of the planar end 514 has to be pushed into the inner surface 412 before the clamping member 405 can be pivoted out from under the rail 80. As this requires a considerable force, the clamping member 405 is stable in the clamping position.

With reference to FIG. 13B, when the footrest 400 and the clamping member 405 are rotated from their respective locked and clamping positions, in a counter-clockwise direction (as viewed from the rear as in FIG. 13A) about the footrest pivot axis 423, the footrest 400 and the clamping member 405 are disposed in their respective adjustment and releasing positions. In this adjustment position of the footrest 400 and corresponding releasing position of the clamping member 405, the support member 470 extends generally upwardly, the mounting brackets 472 are disengaged from the projections 514, and the clamping member 405 extends below the mounting brackets 472 and laterally outer arm 416 of the rail mount 410 without contacting the rail 80. As the clamping member 405 is not pushing upwardly against the rail 80 and the laterally outer arm 416 is not pushing inwardly against the rail 80, the rail 80 is not clamped by the footrest assembly 500 and the footrest assembly 500 is free to be moved along the rail 80 as described above.

It is contemplated that a lever blocking member similar to the lever blocking member 178 of the footrest assemblies 200, 300 could be provided in the footrest assembly 500. For example, the lever blocking member could extend downwardly from the lower surface of the support member 470 or the clamping member arms 464 so as to block all or part of the opening 548 when the footrest 400 is in the locking position and to be pivoted upwardly away from the opening 548 when the footrest 400 is pivoted about the pivot axis 423 in a clockwise direction as viewed from the rear as in FIG. 13A.

Figure 14:
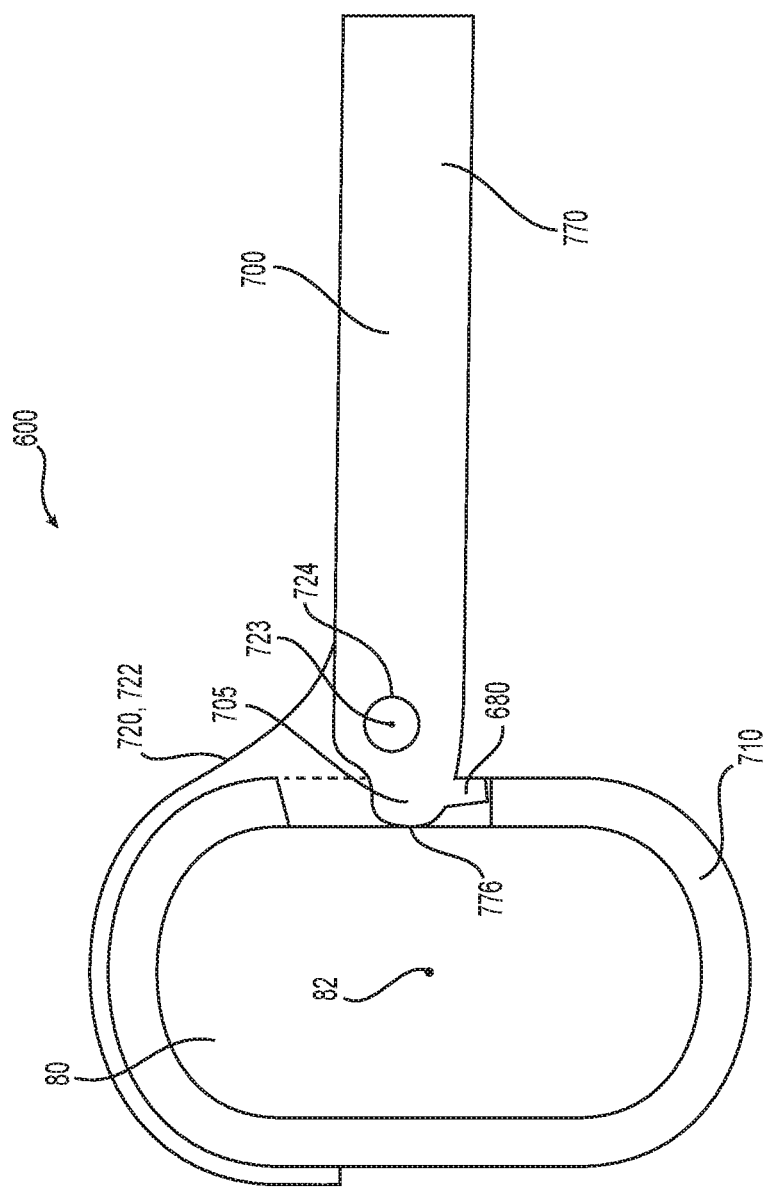
FIG. 14 is a schematic front plan view of yet another implementation of a left footrest assembly and rail with the footrest being disposed in a locked position.

With reference to FIG. 14, another implementation of a footrest assembly 600 will now be described. In the Figures shown herein, the footrest assembly 600 is a left footrest assembly 600 for supporting a driver's left foot but it should be understood that a right footrest assembly would be similar to a mirror image of the left footrest assembly 600 shown herein.

The footrest assembly 600 has some features that are similar to corresponding features of the footrest assemblies 200 and 300 discussed above. Features of the footrest assembly 600 that are similar to corresponding features of the footrest assemblies 200, 300 have been labeled with the same reference numerals.

The footrest assembly 600 has a footrest 700, a clamping member 705 and a rail mount 710. In this implementation, the rail mount 710 is C-shaped and extends along a laterally inner surface, an upper surface and a lower surface of the rail 80. The footrest 700 includes an opening 724 extending therethrough in a direction parallel to the rail axis 82. A footrest mounting bracket 720 includes a generally triangular bracket 722 extending on either side of the footrest 710 (only a rear one of the triangular brackets 722 being shown in FIG. 14 for clarity). The footrest 700 is pivotably connected to the triangular brackets 722 by a pin (not shown) inserted through the aligned openings of the triangular brackets 722 and the footrest 724. Each triangular bracket 722 connects to a rib extending from the bracket 722 along the upper portion of the rail mount to a laterally inner portion of the rail mount 722. The footrest 700 is formed integrally with the clamping member 705. The footrest 700 and clamping member 705 are pivotably connected to the rail mount 710 to be pivotable about a pivot axis 723 defined by the aligned openings 724 of the triangular bracket 722 and footrest 710. The footrest 700 and the clamping member 705 extend on opposite sides of the pivot axis 723. The clamping member 705 has a cam surface 776 which engages the rail 80 on a laterally outer surface thereof when the clamping member 705 is in the clamping position and the footrest 700 is in the locked position. Thus, in the locked position of the footrest 700 and the clamping position of the clamping member 705, the cam surface 776 and the laterally inner portion of the rail mount 710 are disposed on opposite sides of the rail 80, and the cam surface 776 pushes on the rail 80 against the laterally inner portion of the rail mount 710. The cam surface 776 exerts the clamping pressure on the rail 80 to keep the rail 80 clamped between the rail mount 710 and the cam surface 776, i.e. to keep the footrest assembly 600 clamped to the rail 80. The clamping member 705 includes a projection 680 that extends downwards therefrom below the cam surface 776 and abuts an upper edge of the rail mount 710. The projection 680 abutting the edge of the rail mount 710 serves to limit further downward rotation of the footrest 700 about the pivot axis 723 as it takes a certain force to make the projection 680 pivot past the edge of the rail mount 710.

The footrest 700 can be rotated from the locked position, in a counter-clockwise direction (as viewed from the front as in FIG. 14), about the pivot axis 723 to rotate the footrest 700 to the adjustment position and the clamping member 705 to the releasing position. Although not shown, when the footrest 700 is in the adjustment position and the clamping member 705 is in the releasing position, the footrest 700 extends upwards from the pivot axis 723, the clamping member 705 extends downwards from the pivot axis 723, and the cam surface 776 is not in contact with the rail 80. When the footrest 700 is in the adjustment position and the clamping member 705 is in the releasing position, the rail 80 is not clamped between the rail mount 710 and the cam surface 776 and the rail mount 710 is thus slidable along the rail 80 for adjusting the position of the footrest assembly along the rail 80.

It is also contemplated that a lever mounting bracket such as the lever mounting bracket 140, 440 of the footrest assemblies 200, 300, 500 could be connected to the rail mount 710 below the footrest 700 for adjustable connection of a foot-operated lever, such as the brake lever 304. A lever blocking member such as the lever blocking member 178, 478 the footrest assemblies 200, 300, 500 could extend downwards form the lower surface of the footrest 700 to block adjustment of a position of the foot-operated lever as described above for the footrest assemblies 200, 300, 500.

The configurations of the footrest assemblies 200, 300, 500, 600 described above allow the footrest 100, 400, 700 to be adjusted to any position along the rail 80, and to perform the adjustment without the use of any tools. In addition, the configurations of the footrest assemblies 200, 300, 500, 600 described above also allow the brake lever 304 (or another foot-operated lever) to be moved with the footrest 100, 400, 700 without having to readjust the position of the brake lever 304 with respect to the footrest 100, 400, 700. Even further, the configurations of the footrest assemblies 200, 300, 500, 600 described above also allow the brake lever 304 to be moved with the hydraulic cylinder 312 thereby eliminating the need for reconfiguring the connection of the brake lever 304 to the brake actuation system 310.

Modifications and improvements to the above-described implementations of the present vehicle may become apparent to those skilled in the art. The foregoing description is intended to be exemplary rather than limiting. The scope of the present technology is therefore intended to be limited solely by the scope of the appended claims.

What is claimed is:

1. A footrest assembly for mounting to a rail of a vehicle, a position of the footrest assembly along the rail being adjustable, the footrest assembly comprising:
   a rail mount;
   a footrest pivotally connected to the rail mount about a footrest pivot axis, the footrest being pivotable about the footrest pivot axis between an adjustment position and a locked position; and
   a clamping member movable by the footrest relative to the rail mount between a releasing position and a clamping position,
   the clamping member being in the releasing position when the footrest is in the adjustment position, the adjustment position of the footrest allowing adjustment of the footrest assembly along the rail,
   the clamping member being in the clamping position when the footrest is in the locked position, the clamping member in the clamping position having a portion facing a portion of the rail mount, the portion of the clamping member and the portion of the rail mount being disposed on opposite sides of the rail when the clamping member is in the clamping position and the footrest assembly is mounted to the rail, the clamping member applying a clamping pressure to the rail when the clamping member is in the clamping position and the footrest assembly is mounted to the rail, the locked position setting the position of the footrest assembly along the rail.

2. The footrest assembly of claim 1, wherein the footrest pivot axis extends parallel to a central axis of the rail in the position of the footrest assembly along the rail.

3. The footrest assembly of claim 1, wherein the portion of the clamping member is closer to the portion of the rail mount in the clamping position than in the releasing position.

4. The footrest assembly of claim 1, wherein the clamping member is pivotally connected to the rail mount about a clamping member pivot axis, the clamping member being pivotable about the clamping member pivot axis between the releasing position and the clamping position, the clamping member pivot axis being spaced from the footrest pivot axis.

5. The footrest assembly of claim 4, wherein the clamping member pivot axis extends parallel to the footrest pivot axis.

6. The footrest assembly of claim 4, further comprising a foot-operated lever being pivotably connected to the rail mount.

7. The footrest assembly of claim 6, wherein a position of the lever with respect to the rail mount is adjustable when the footrest is in the adjustment position and the clamping member is in the releasing position.

8. The footrest assembly of claim 7, wherein:
   the rail mount comprises a lever mounting bracket, the lever being pivotably connected to the rail mount by the lever mounting bracket; and
   one of the footrest and the clamping member comprises a lever blocking member, the lever blocking member being movable with respect to the lever mounting bracket with the one of the footrest and the clamping member about a corresponding one of the footrest pivot axis and the clamping member pivot axis, the lever blocking member being positioned so as to prevent adjustment of the position of the lever when the footrest is in the locked position and the clamping member is in the clamping position, the lever blocking member being positioned so as to allow adjustment of the position of the lever when the footrest is in the adjustment position and the clamping member is in the releasing position.

9. The footrest assembly of claim 6, wherein the lever is selectively mounted to the rail mount in one of at least a first rest position and a second rest position,
   when mounted to the rail mount in the first rest position, the lever is biased towards the first rest position and pivotable therefrom, about a first lever pivot axis, to a plurality of first actuated positions, and
   when mounted to the rail mount in the second rest position, the lever is biased towards the second rest position and pivotable therefrom, about a second lever pivot axis, to a plurality of second actuated positions.

10. The footrest assembly of claim 9, wherein:
    the first lever pivot axis is coaxial with the second lever pivot axis; and
    the first rest position is rotated about the first lever pivot axis with respect to the second rest position.

11. The footrest assembly of claim 10, wherein:
    the lever is a brake lever connected to a brake actuation system for actuating a brake of the vehicle; and
    the footrest assembly further comprises a brake lever adjustment assembly, the brake lever adjustment assembly comprising:
    a lever splined member (LSM) coaxial with the first lever pivot axis and fixed to the brake lever to be rotatable with the brake lever about the first lever pivot axis;
    a brake lever adjustment splined member (BLASM) pivotably connected to the rail mount about the first lever pivot axis and operatively connected to the brake actuation system for actuating the brake, the BLASM having a BLASM rest position corresponding to an unactuated configuration of the brake, the BLASM being rotatable about the first lever pivot axis from the BLASM rest position to a plurality of BLASM actuated positions for actuating the brake;

the BLASM in the BLASM rest position selectively engaging the LSM with the lever disposed in any one of the first rest position and the second rest position, when the BLASM in the BLASM rest position engages the LSM in the first rest position, the plurality of first actuated positions correspond to the plurality of BLASM actuated positions for actuating the brake, and when the BLASM in the BLASM rest position engages the LSM in the second rest position, the plurality of second actuated positions correspond to the plurality of BLASM actuated positions for actuating the brake.

12. The footrest assembly of claim 6, wherein:

the lever is a brake lever connected to a brake actuation system for actuating a brake of the vehicle; and the footrest assembly further comprises a master cylinder mounting bracket connected to the rail mount and moveable therewith, the master cylinder mounting bracket being adapted for connection of a master cylinder of the brake actuation system.

13. The footrest assembly of claim 1, wherein the footrest has a cam surface adapted for pushing the clamping member to the clamping position when the footrest is moved to the locked position.

14. The footrest assembly of claim 13, wherein the cam surface is adapted to exert a greater pressure on the clamping member when the footrest is at an intermediate position between the locked position and the adjustment position than when the footrest is in the locked position and when the footrest is in the adjustment position.

15. The footrest assembly of claim 1, wherein the clamping member is pivotable about the footrest pivot axis between the releasing position and the clamping position.

16. The footrest assembly of claim 15, wherein the clamping member is integrally formed with the footrest.

17. The footrest assembly of claim 16, wherein the clamping member has a cam surface adapted to abut the rail when the clamping member is in the clamping position.

18. A vehicle comprising:

a frame defining a longitudinal centerplane;

a motor supported by the frame;

at least one front wheel and at least one rear wheel supported by the frame, at least one of the at least one front wheel and the at least one rear wheel being operatively connected to the motor;

a straddle seat supported by the frame;

a left rail connected to the frame, the left rail being disposed below the straddle seat and extending at least in a longitudinal direction on a left side of the longitudinal centerplane;

a right rail connected to the frame, the right rail being disposed below the straddle seat and extending at least in the longitudinal direction on a right side of the longitudinal centerplane;

a left footrest assembly according to claim 1 mounted on the left rail; and a right footrest assembly according to claim 1 mounted on the right rail.

19. The vehicle of claim 18, wherein each of the left rail and the right rail has a non-circular cross-section.

20. The vehicle of claim 19, wherein the cross-section is generally stadium-shaped.

* * * * *